(12) United States Patent
Urata

(10) Patent No.: US 8,340,506 B2
(45) Date of Patent: Dec. 25, 2012

(54) SYSTEM AND METHOD FOR SIGNAL PROCESSING

(75) Inventor: Kaoru Urata, Kanagawa (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 12/695,201

(22) Filed: Jan. 28, 2010

(65) Prior Publication Data

US 2010/0195986 A1 Aug. 5, 2010

(30) Foreign Application Priority Data

Feb. 5, 2009 (JP) ................................ P2009-024376

(51) Int. Cl.
*H04N 5/917* (2006.01)
(52) U.S. Cl. ......................................... 386/328; 386/355
(58) Field of Classification Search .................... None
See application file for complete search history.

(56) References Cited

U.S. PATENT DOCUMENTS

| 5,999,657 A * | 12/1999 | Yasuhiko | 382/248 |
|---|---|---|---|
| 2001/0031002 A1 | 10/2001 | Hashimoto et al. | |
| 2008/0310739 A1 | 12/2008 | Endo | |

FOREIGN PATENT DOCUMENTS

| EP | 1 143 736 | 10/2001 |
|---|---|---|
| EP | 1 703 735 | 9/2006 |
| JP | 7 115649 | 5/1995 |
| JP | 7 298263 | 11/1995 |
| JP | 10 234043 | 9/1998 |
| JP | 2001 36201 | 2/2001 |
| JP | 2004 193941 | 7/2004 |
| JP | 2004 356857 | 12/2004 |
| JP | 2008 54183 | 3/2008 |
| WO | WO 99 38316 | 7/1999 |
| WO | WO 2004 100557 | 11/2004 |

OTHER PUBLICATIONS

Lambert P et al., "Flexible macroblock ordering in H.264/AVC", Journal of Visual Communication and Image Representation, Academic Press, Inc, US, vol. 17. No. 2, Apr. 1, 2006, pp. 358-375, XP024905097, ISSN: 1047-3203, DOI: DOI:10.1016/J.JVCIR.2005.05.008.

* cited by examiner

*Primary Examiner* — Huy T Nguyen
(74) *Attorney, Agent, or Firm* — Frommer Lawrence & Haug LLP; William S. Frommer

(57) ABSTRACT

A system and method for processing image signals, including a signal dividing unit for dividing input image signals per frame into a first plurality of sub-blocks with a second plurality of the sub-blocks being included in the horizontal direction and each of the sub-blocks having the height equal to that of at least one macro-block, a recording unit for recording thus divided input image signals, a third plurality of encoding units each for encoding the divided and recorded input image signals in units of sub-block to be outputted as an encoded stream with the number of the encoding units equal to that of the sub-blocks in the horizontal direction, a further recording unit for recording the encoded stream in units of sub-block, and a stream conversion unit for outputting a video stream after rearranging the order of the encoded and recorded stream.

6 Claims, 17 Drawing Sheets

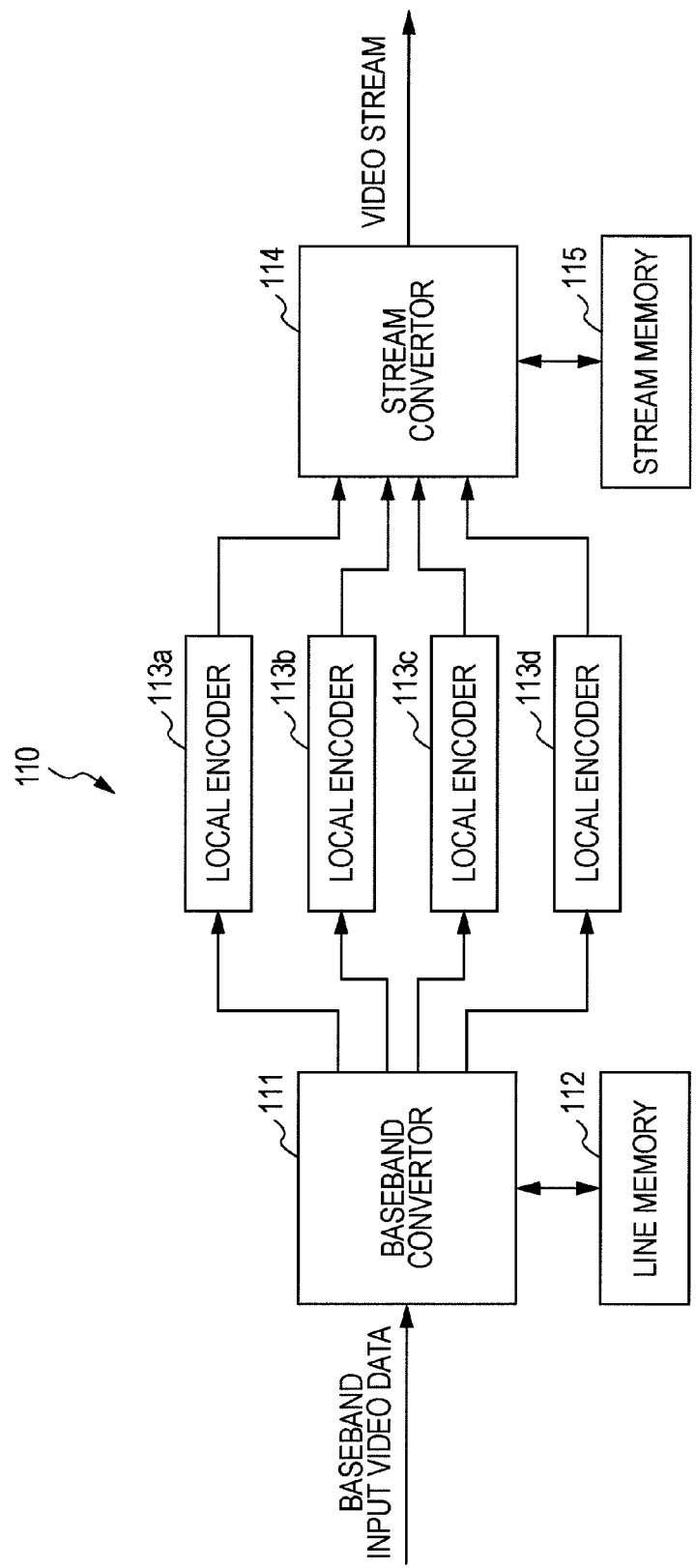

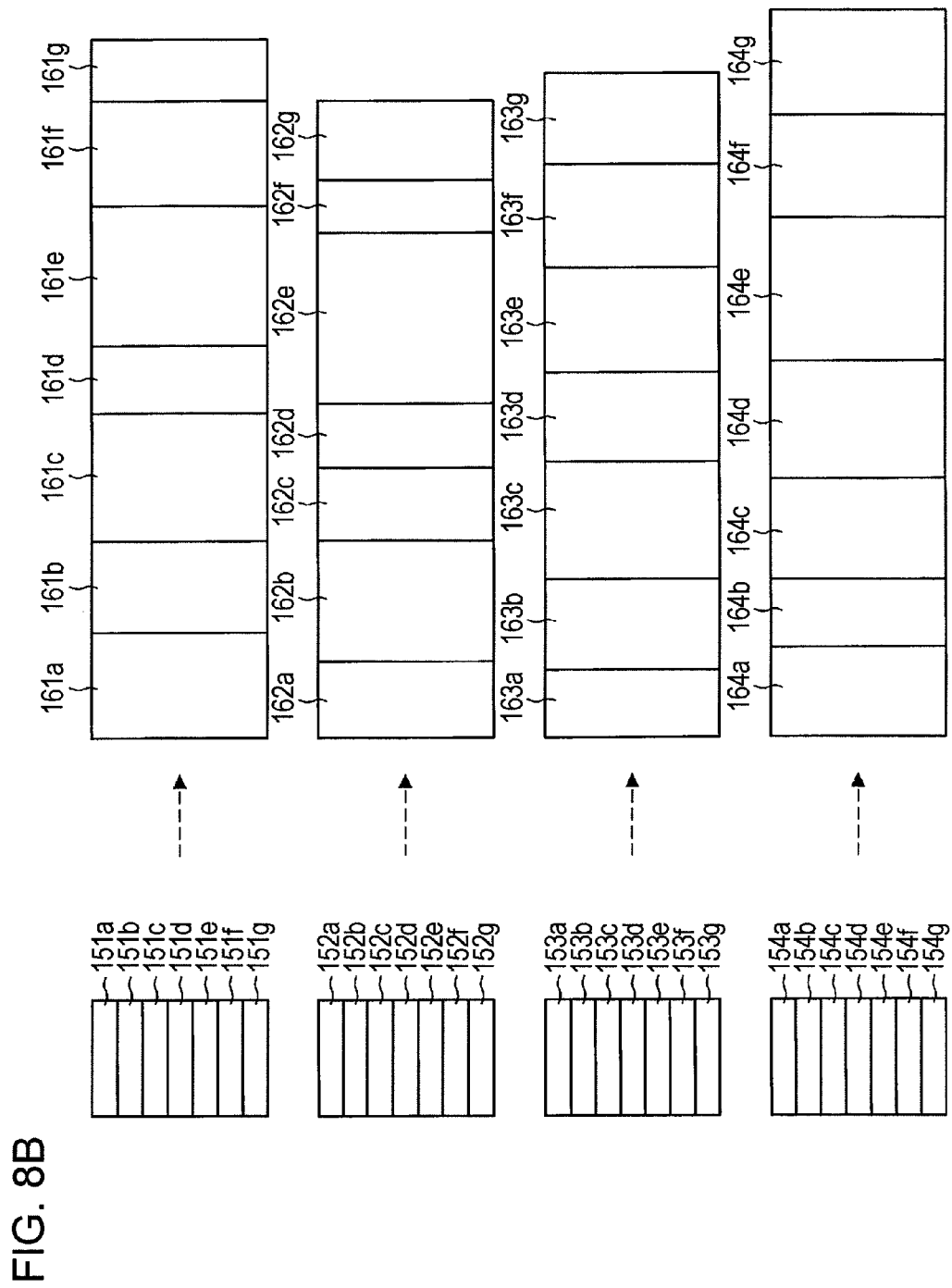

SYSTEM AND METHOD FOR SIGNAL PROCESSING

BACKGROUND OF THE INVENTION

1. Field of the Invention

The invention relates generally to signal processing systems and methods, and more particularly, to a system and method for processing image signals.

2. Description of the Related Art

The trend toward upsizing and higher resolution of display devices is ever increasing in recent years. With such trend of display device advancement, the demand has also grown for improving the capabilities of encoding processing and decoding processing of the images to be displayed on display devices (see, for example, Japanese Unexamined Patent Application Publications No. 2001-346201, 2004-356857, 2008-54183, and Heisei 10 (1998)-234043). In order to improve the processing capability of MPEG (moving picture experts group) decoder, for example, it is necessary to increase computing power of the processing unit for carrying out decoding processing, and also increase the bandwidth (transmission capacity) between external memories for storing decoded screen data. In addition, for improving the processing capability of MPEG encoder, it is necessary to increase the computing power of encoding processing unit for implementing the encoding processing, also to increase the bandwidth of transmission between external memories for storing encoded screen data.

In particular, with the block code in which encoding is carried out within frame such as in MPEG4 Studio Profile, when the encoding processing and decoding processing are further carried out on video signals with large image size such as 4K video signals, the codec processing has to be implemented at high speed. FIGS. 1 and 2 are drawings for illustrating the structure of a related art signal processing system for implementing encoding processing and decoding processing of video signals with large image size.

Although the details of the related art signal processing system 10 shown in FIGS. 1 and 2 will be described later on, it is explained herein briefly. With the related art signal processing system 10, image data are stored once in a frame memory 12, and thus stored data are subsequently distributed to plural local encoders 13a to 13d in units of frame. The image data encoded by the local encoders 13a to 13d are stored in a stream memory 15, arranged into the order of frame, and recorded on a record medium 16. As a result, since it is necessary for each of the local encoders to implement the encoding processing at a rate only once to four frames, the speed of the processing can be reduced.

In the case of reproducing video images, the image data read from the record media 16 are stored in the stream memory 15, and the stored data are distributed to plural local decoders 17a to 17d in units of frame. The image data decoded by the local decoders 17a to 17d are stored in the frame memory 15, arranged into the order of frame, and outputted as baseband signals.

SUMMARY OF THE INVENTION

With the related art signal processing system and method, however, there is encountered during the period of video data recording, a difficulty of necessitating a frame memory 12 with large storage capacity as well as wideband characteristics in order to store temporarily the data in units of frame prior to the data compression. In addition, also in recording the video data, another difficulty is encountered of necessitating a stream memory 15 with large capacity and wideband characteristics in order to store temporarily the image data in units of frame subsequent to the data compression. Furthermore, during the period of video data reproduction, still another difficulty arises of necessitating a stream memory 15 having large capacity and wideband characteristics for temporarily storing the data prior to the data expansion. In addition, also in reproducing the video data, another difficulty arises of necessitating a frame memory 12 having large capacity and wideband characteristics for temporarily storing the data subsequent to the data expansion.

As for the frame memory 12, in particular, the bandwidth of as much as approximately twice that of the baseband signal becomes necessary for effectively carrying out both the inputting and outputting simultaneously. Namely, for the baseband signal in the order ranging from 19 to 20 G byte/second, the bandwidth necessary for the frame memory 12 amounts to even as much as about 40 G byte/second. Loading the memory devices with such broad bandwidths will force to result in problems such as the increase in circuit size inside the system, power consumption, production costs, and so forth.

In view of the above-mentioned difficulties, there is provided according to an embodiment of the invention, a noble system and method for processing image signals having improved capabilities of achieving the enhancement of processing speed, while suppressing the storage capacity and bandwidth of memory devices for use in buffering the image data.

According to an embodiment of the present invention, there is provided a signal processing system including a signal dividing unit configured to divide input image signals per frame into a first plurality of sub-blocks to form divided input image signals such that a second plurality of the sub-blocks are included in the horizontal direction and each of the first plurality of sub-blocks has the height in the vertical direction equal to that of at least one macro-block; a first recording unit configured to record the divided input image signals, which are divided by the signal dividing unit in units of the sub-block to form divided and recorded input image signals; a third plurality of encoding units each configured to encode the divided and recorded input image signals, which are recorded in first recording unit after being divided by the signal dividing unit, in units of the sub-block to be outputted as an encoded stream, in which the number of the third plurality of encoding units is equal to the number of the sub-blocks divided by the signal dividing unit in the horizontal direction; a second recording unit configured to record the encoded and stream in units of the sub-block to form an encoded and recorded stream; and a stream conversion unit configured to output a video stream after rearranging the encoded and recorded stream, which are recorded in the second recording unit, so that the order of the encoded and recorded stream coincides with that of the input image signals.

With the configuration mentioned above, the signal dividing unit is configured to divide input image signals per frame into a first plurality of sub-blocks to form divided input image signals such that a second plurality of the sub-blocks are included in the horizontal direction and each of the first plurality of sub-blocks has the height in the vertical direction equal to that of at least one macro-block; and the first recording unit is configured to record thus divided input image signals in units of the sub-block to form divided and recorded input image signals. In addition, the third plurality of encoding units are each configured to encode the divided and recorded input image signals, which are recorded in first recording unit after being divided by the signal dividing unit, in units of the sub-block to be outputted as an encoded stream. In this case, the number of the third plurality of encoding units is made equal to the number of the sub-blocks in the horizontal direction, which are divided by the signal dividing unit. Still in addition, the second recording unit is configured to record the encoded stream in units of the sub-block to form an encoded and recorded stream, and the stream conversion unit is configured to output a video stream after rearranging the encoded and recorded stream, which are recorded in the second recording unit, such that the order of the encoded and recorded stream coincides with that of the input image signals. As a result, by dividing the input image signals into the plurality sub-blocks and by implementing the recording and reproducing processes of image data by the recording units in units of sub-block, improvement in the speed of image-processing can be achieved, while suppressing the capacity and bandwidth of the memory devices for use in buffering the image data.

The signal dividing unit may be configured to add an identifier for identifying the region in the horizontal direction on dividing the input image signals into the macro-blocks.

According to another embodiment of the present invention, there is provided a signal processing system including a signal dividing unit configured to divide a video stream per frame so as to correspond to a first plurality of sub-blocks to form a divided video stream such that a second plurality of the sub-blocks are included in the horizontal direction and each of the first plurality of sub-blocks has the height in the vertical direction equal to that of at least one macro-block; a first recording unit configured to record the divided video stream, which are divided by the signal dividing unit, in units of the sub-block to form a divided and recorded video stream; a third plurality of decoding units each configured to decode the divided and recorded video stream, which is recorded in the first recording unit after being divided by the signal dividing unit in units of the sub-block to be outputted as decoded data, in which the number of the third plurality of decoding units is equal to the number of the sub-blocks divided by the signal dividing unit in the horizontal direction; a second recording unit configured to record the decoded data in units of the sub-block to form decoded and recorded data; an image signal conversion unit configured to output image signals after rearranging the decoded and recorded data, which are recorded in the second recording unit, so that the order of the decoded and recorded data coincides with that of the video stream.

With the configuration mentioned above, the signal dividing unit is configured to divide a video stream per frame so as to correspond to a first plurality of sub-blocks to form a divided video stream such that a second plurality of the sub-blocks are included in the horizontal direction and each of the first plurality of sub-blocks has the height in the vertical direction equal to that of at least one macro-block; and the first recording unit is configured to record temporarily the divided video stream, which are divided by the signal dividing unit, in units of the sub-block to form a divided and recorded video stream. In addition, the third plurality of decoding units are each configured to decode the divided and recorded video stream, which is recorded in first recording unit after being divided by the signal dividing unit, in units of the sub-block to be outputted as an decoded data. In this case, the number of the third plurality of decoding units is made equal to the number of the sub-blocks in the horizontal direction, which are divided by the signal dividing unit. Still in addition, the second recording unit is configured to record the decoded data in units of the sub-block to form decoded and recorded data, and the image signal conversion unit is configured to output image signals after rearranging the decoded and recorded data, which are recorded in the second recording unit, such that the order of the decoded and recorded data coincides with that of the video stream. As a result, by dividing the video stream into the plurality sub-blocks and by implementing the recording and reproducing processes of the video stream by the recording units in units of sub-block, improvement in the speed of image-processing can be achieved, while suppressing the capacity and bandwidth of the memory devices for use in buffering the image data.

The signal dividing unit may be configured to add an identifier for identifying a region in the horizontal direction on dividing the video stream into the macro-blocks.

According to still another embodiment of the present invention, there is provided a signal processing method including the steps of dividing input image signals per frame into a first plurality of sub-blocks to form divided input image signals such that a second plurality of the sub-blocks are included in the horizontal direction and each of the first plurality of sub-blocks has the height in the vertical direction equal to that of at least one macro-block; recording the divided input image signals, which are divided in the abovementioned step of dividing, in units of the sub-block to form divided and recorded input image signals; encoding the divided and recorded input image signals, which are recorded in the step of recording the input image signal data after being divided in the step of dividing, by a third plurality of encoding means in units of the sub-block to be outputted as an encoded stream, in which the number of the third plurality of encoding means is equal to the number of the sub-blocks in the horizontal direction; recording the encoded stream in units of the sub-block to form an encoded and recorded stream; and outputting a video stream subsequent to stream conversion after rearranging the encoded and recorded stream, which are recorded in the step of recording the encoded stream, such that the order of the encoded and recorded stream coincides with that of the input image signals.

According to another embodiment of the present invention, there is provided a signal processing method including the steps of dividing a video stream per frame so as to correspond to a first plurality of sub-blocks to form a divided video stream such that a second plurality of the sub-blocks are included in the horizontal direction and each of the first plurality of sub-blocks has the height in the vertical direction equal to that of at least one macro-block; recording the divided image stream, which are divided in the abovementioned step of dividing, in units of the sub-block to form a divided and recorded video stream; decoding the divided and recorded video stream, which are recorded in the step of recording the image stream after being divided in the step of dividing, by a third plurality of decoding means in units of the sub-block to be outputted as decoded data, in which the number of the third plurality of decoding means is equal to the number of the sub-blocks in the horizontal direction; recording the decoded data in units of the sub-block to form decoded and recorded data; and outputting image signals subsequent to image signal conversion after rearranging the decoded and recorded data, which are recorded in the step of recording the decoded data, such that the order of the decoded and recorded data coincides with that of the video stream.

As described hereinabove according to the embodiment of the present invention, while suppressing the capacity and bandwidth of memory devices for use in buffering the image data, a noble system and method for processing image signals can be provided having improved capabilities of achieving the enhancement of processing speed.

BRIEF DESCRIPTION OF THE DRAWINGS

FIG. 7 is a diagram illustrating the configuration of the video encoder according to the embodiment of the invention;

FIG. 8B is another diagram schematically illustrating the feature of encoding processing of the image data with the video encoder according to the embodiment of the invention;

DESCRIPTION OF THE PREFERRED EMBODIMENTS

Figure 1:
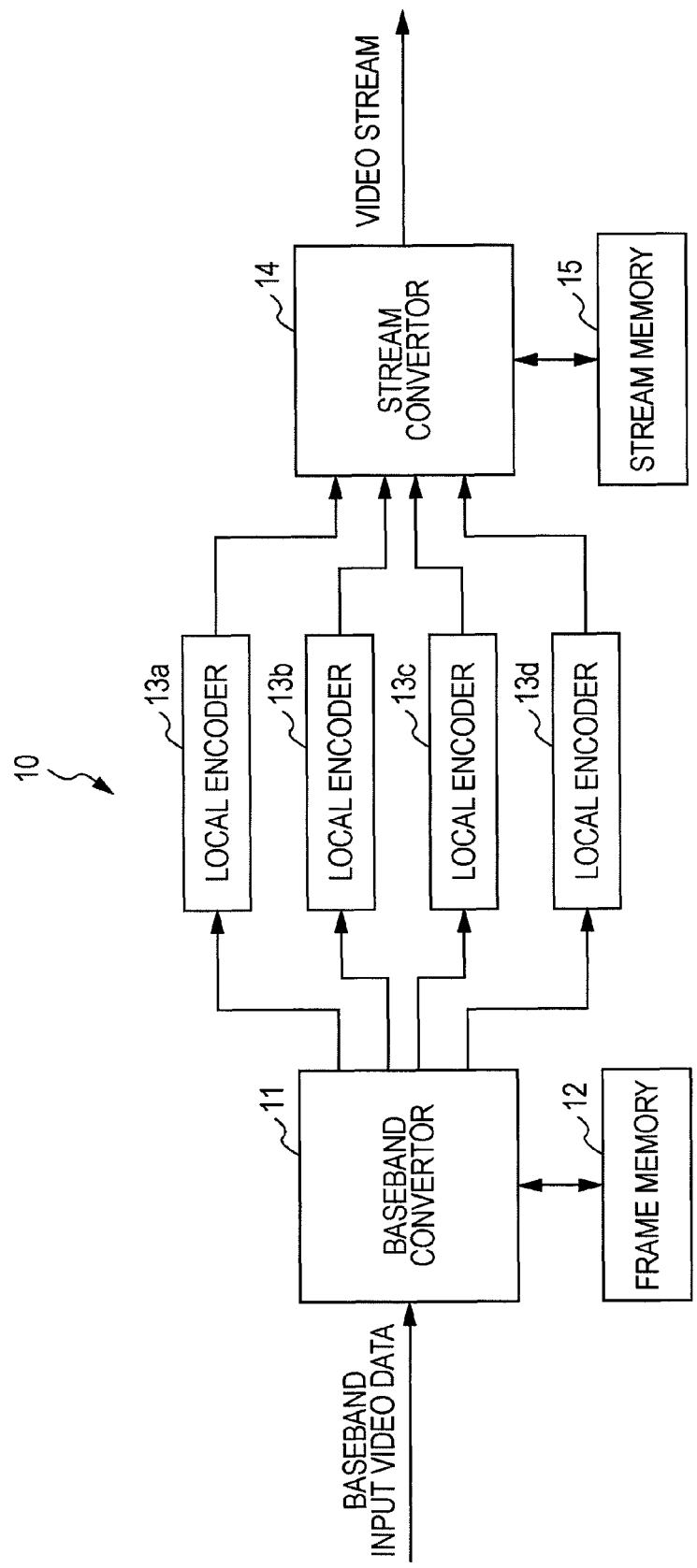
FIG. 1 is a drawing illustrating the structure of related art signal processing system taking notice primarily on recording period of baseband signals.

Referring now to the drawings, preferable embodiments of the present invention will be described hereinbelow. In the description of the embodiments and the drawings, the elements and units included therein having substantially the same capabilities are shown with identical numerical representations and the repeated description thereof is omitted.

Preferable embodiments of the present invention will be detailed hereinbelow in the order as follows.

1. An example of the structure of a related art signal processing system.
2. An embodiment according to the present invention.
 2-1. The configuration of video recording/reproducing system according to the embodiment of the invention.
 2-2. The configuration of video encoder according to the embodiment of the invention.
 2-3. The configuration of video decoder according to the embodiment of the invention.
 2-4. Encoding processing steps of video data according to the embodiment of the invention.
 2-5. Decoding processing steps of video data according to the embodiment of the invention.
 2-6. Summary.
3. Modifications.
 3-1. A first modification to the embodiment of the invention.
 3-2. A second modification to the embodiment of the invention.

1. An Example of the Structure of Related Art Signal Processing System

Figure 2:
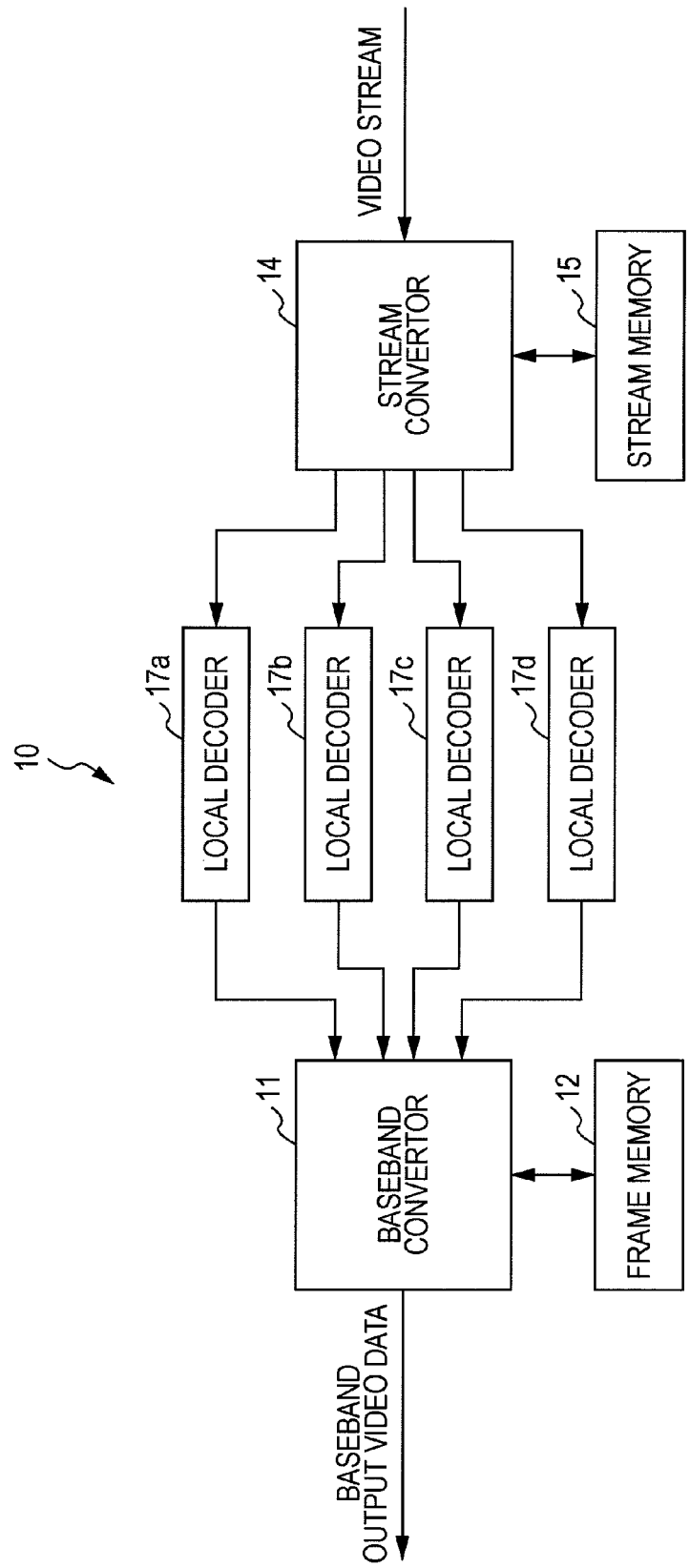
FIG. 2 is another drawing illustrating the structure of related art signal processing system taking notice on reproducing period of baseband signals.

Prior to the description of an embodiment of the present invention, there is explained first the structure of related art signal processing system. FIGS. 1 and 2 are drawings illustrating the structure of related art signal processing system 10. FIG. 1 illustrates the structure of the signal processing system 10 taking notice primarily on recording process of baseband signals, and FIG. 2 illustrates the structure of the signal processing system 10 taking notice on reproducing process of baseband signals.

As shown in FIGS. 1 and 2, the related art signal processing system 10 is provided, including a baseband converter 11, a frame memory 12, local encoders 13a to 13d, a stream converter 14, a stream memory 15, a recording medium 16, and local decoders 17a to 17d.

The baseband converter 11 is operable to temporarily store, into the frame memory 12, baseband video data to be inputted into the signal processing system 10. In addition, the baseband converter 11 is operable so that the baseband video data, which are stored in the frame memory 12, are distributed and subsequently outputted to the local encoders, 13a to 13d, in units of frame, thereby forming baseband image data. The frame memory 12 is thus configured to temporarily store the baseband image data to be inputted into the signal processing system 10 under the control of the baseband converter 11.

The local encoders 13a to 13d are each operable to encode the image data according to predetermined coding systems such as MPEG and so forth. With the structure shown in FIG. 1, the baseband converter 11 is operable to distribute the image data stored in the frame memory 12 in units of frame among the local encoders 13a to 13d. Therefore, the local encoders 13a to 13d are each configured to encode the image data at the rate of once in four frames, and to output the image data subsequent to the encoding to the stream converter 14, respectively.

The stream converter 14 is operable to receive the image data which are encoding processed by the local encoders 13a to 13d, and to store temporarily thus received image data in the stream memory 15. In addition, the stream converter 14 is operable to rearrange the image data, which are stored in the stream memory 15, into the order of actual frame, and to output to the recording medium 16 as a video stream. The stream memory 15 is configured to temporarily store the image data, which are encoding processed with the local encoders, 13a to 13d, under the control of the stream converter 14. The recording medium 16 records the video stream, which are rearranged into the order of actual frame to subsequently be outputted, by the stream converter 14.

The local decoders 17a to 17d are operable to decode the image data encoded by the local encoders 13a to 13d. In reproducing the video data recorded on the recording medium 16 with the structure shown in FIG. 2, the video data recorded on the recording medium 16 is read by the stream converter 14 and stored temporarily in the stream memory 15. Subsequently, the stream converter 14 distributes the video data stored in the stream memory 15 in units of frame among the local decoders 17a to 17d. As a result, the local decoders 17a to 17d are each configured to decode the image data at a rate once in four frames, and output the image data after decoding to the baseband converter 11. The baseband converter 11 receives the image data, which are decoding processed by the local decoders 17a to 17d, and instructs the frame memory 12 to temporarily store thus received image data. The baseband converter 11 rearranges the image data, which are stored in the frame memory 12, to be in order of the actual frame, to subsequently output as baseband video data.

Figure 3:
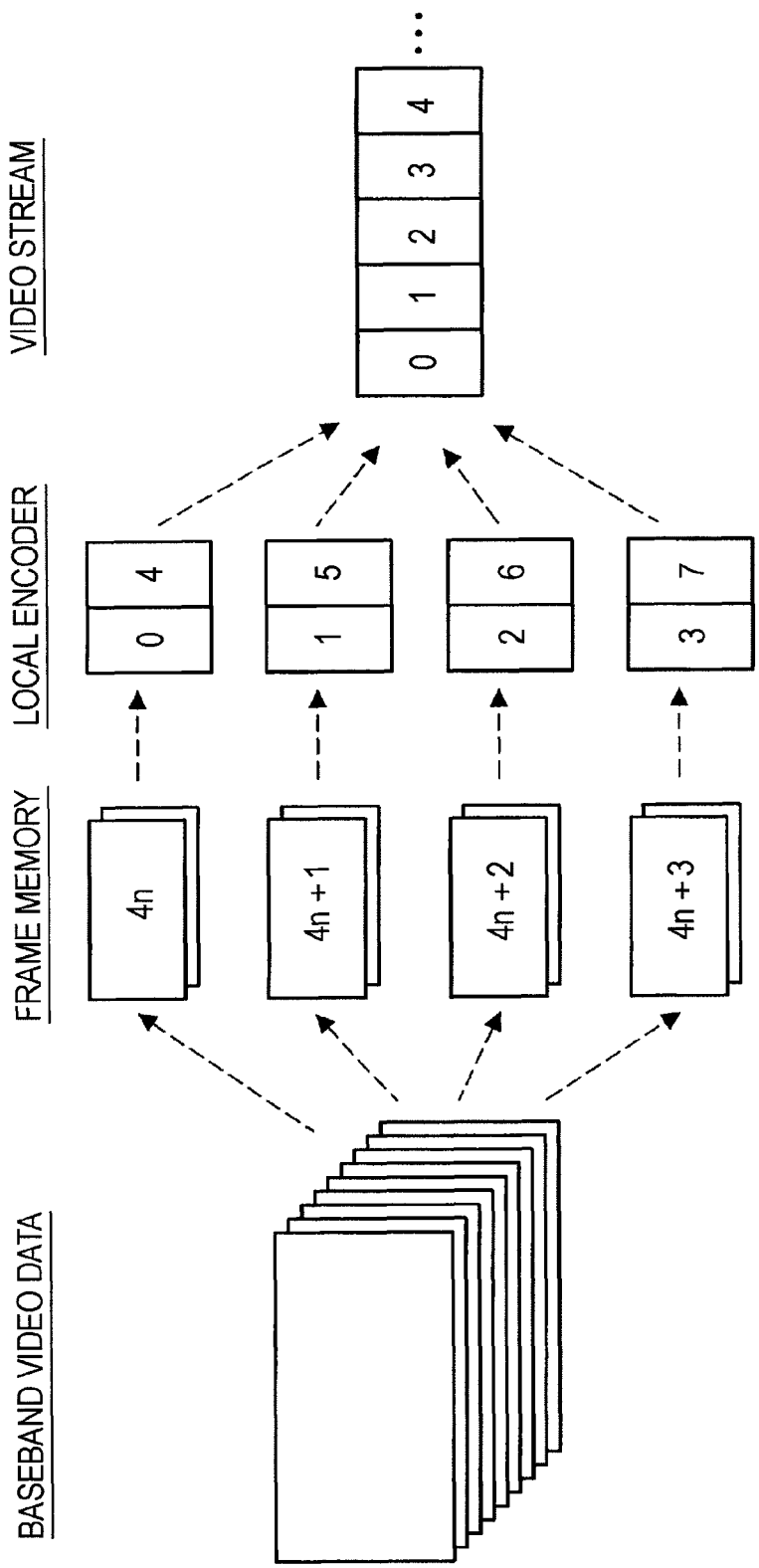
FIG. 3 is a drawing schematically illustrating the case where image data are encoded and then recorded with the related art signal processing system.
Figure 4:
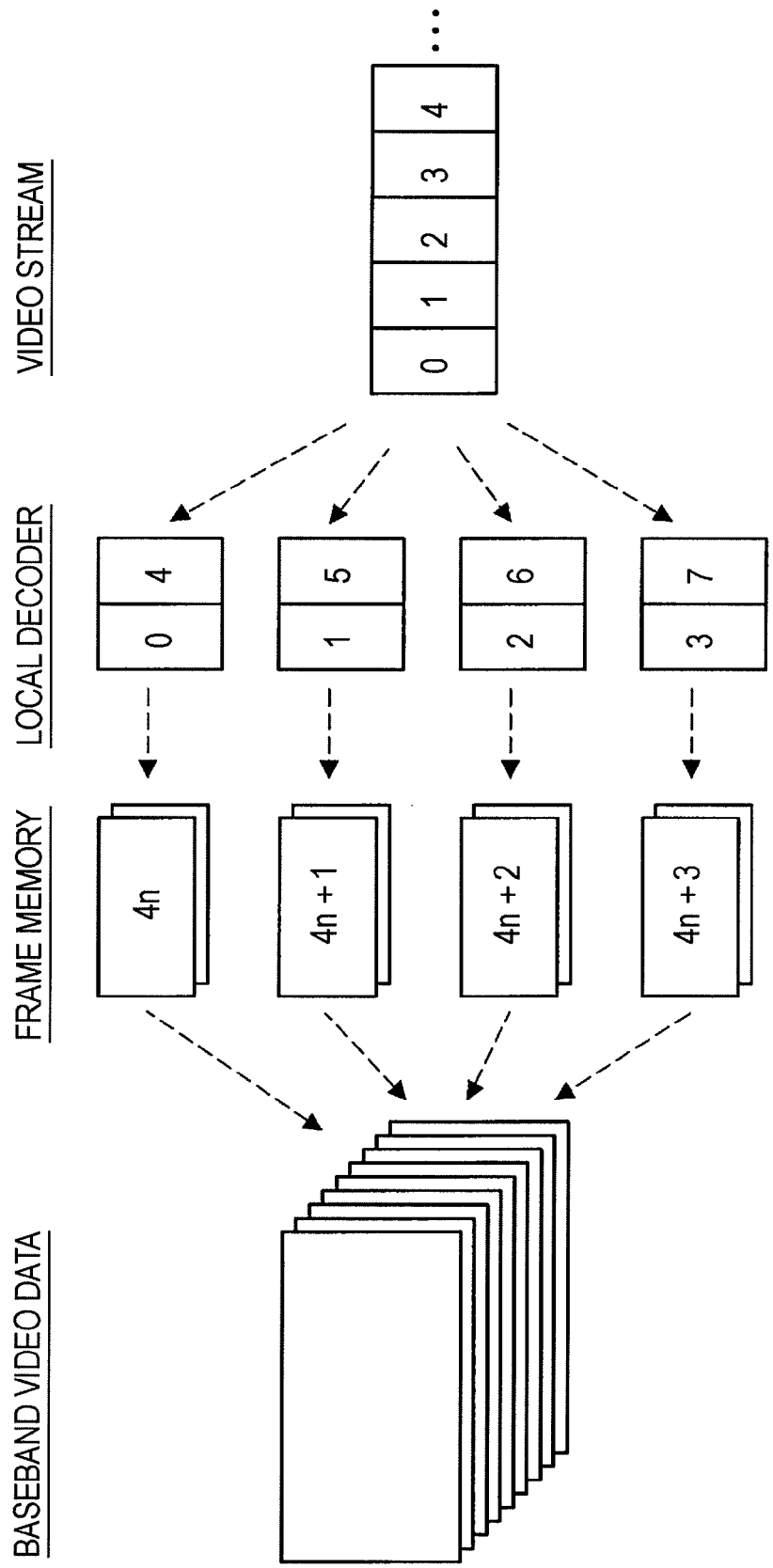
FIG. 4 is a drawing schematically illustrating the case where image data are decoded and reproduced with the related art signal processing system.

FIG. 3 is a drawing schematically illustrating the case where video data are encoded and recorded with the related art signal processing system 10, and FIG. 4 is another drawing schematically illustrating the case where video data are decoded and reproduced with the related art signal processing system 10. As shown in FIG. 3, in encoding and recording the video data with the related art signal processing system 10, the video data are divided into each of the frames and sent to the local encoders 13a to 13d. After encoding processing the video data with the local encoders 13a to 13d to which the image data were sent, the signal processing system 10 is configured to rearrange the video data into the order of actual frame to be recorded subsequently. In addition, as shown in FIG. 4, in decoding and reproducing the video data with the related art signal processing system 10, the video data are divided into each of the frames and sent to the local decoders 17a to 17d. After decoding processing the video data with the local decoders 17a to 17d to which the video data are sent, the signal processing system 10 is configured to rearrange the video data into the order of the actual frame, and to reproduce subsequently.

With the related art signal processing system 10, therefore, improvement has been devised in the speed enhancement of encoding and decoding processing by providing plural encoders and decoders and by distributing the processing among these encoders and decoders.

However, with the related art signal processing system 10 during the period of video data recording as mentioned above, there is encountered a difficulty of necessitating a frame memory 12 provided with large capacity and wideband characteristics in order to temporarily store the data in units of frame prior to the data compression. Also with the related art signal processing system 10, another difficulty is encountered of necessitating a stream memory 15 of large capacity and wideband characteristics in order to store temporarily the data in units of frame subsequent to the data compression. Furthermore, during the period of video data reproduction, still another difficulty arises of necessitating a stream memory 15 of large capacity and wideband characteristics for temporarily storing the data in units of frame prior to the data expansion. In addition, with the related art signal processing equipment 10, still another difficulty arises of necessitating a frame memory 12 of large capacity and wideband characteristics for temporarily storing the data in units of frame subsequent to the data expansion. With the frame memory 12, in particular, the bandwidth as much as approximately twice that of the baseband signal becomes necessary for effectively carrying out both the inputting and outputting simultaneously. Namely, for the baseband signal in the order ranging from 19 and 20 G byte/second, the bandwidth necessary for the frame memory 12 amounts to even as much as about 40 G byte/second. Loading the memory devices with such broad bandwidths will force to result in problems such as the increase in circuit size inside the system, power consumption, production costs, and so forth.

2. An Embodiment According to the Present Invention

Accordingly, in the embodiment of the present invention, the encoding processing and decoding processing are devised to be carried out with plural encoders and decoders herein provided, by dividing video data in each of the frames into a plurality of blocks and by distributing respective blocks among the encoders and decoders according to a predetermined rule. By dividing the video data in each of the frames into the plurality of blocks, the speed enhancement of encoding and decoding processing can be achieved without using broadband memories.

Figure 5:
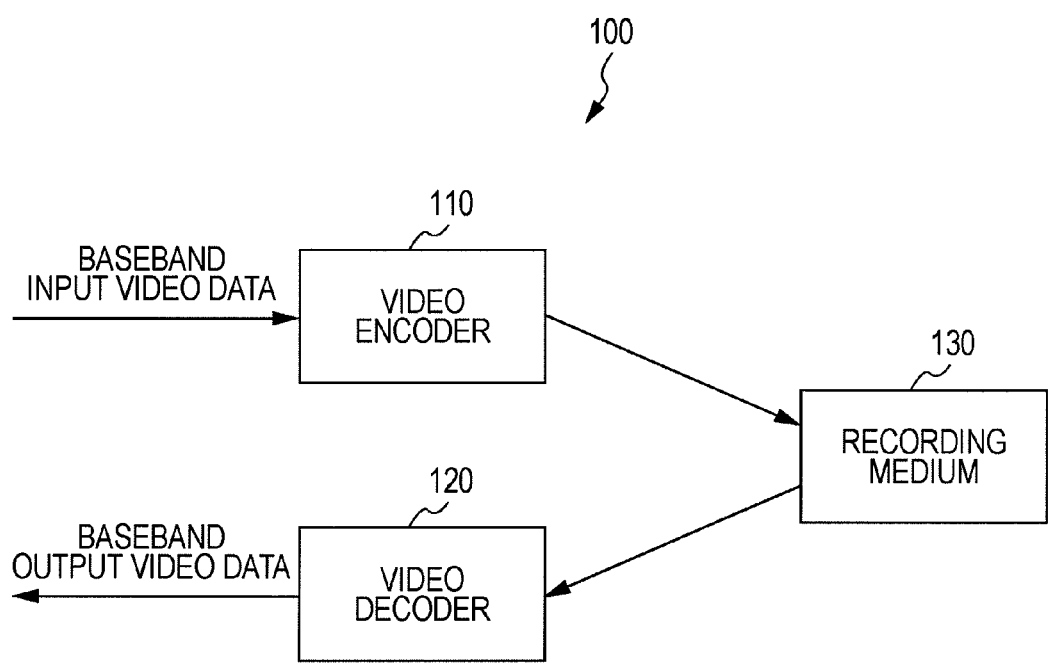
FIG. 5 is a drawing illustrating the configuration of the video recording/reproducing system according to an embodiment of the invention.

2-1. The Configuration of Video Recording/Reproducing System According to the Embodiment of the Invention In the first place, there described is the configuration of a video recording/reproducing system according to the embodiment of the invention. FIG. 5 is a diagram schematically illustrating the structure of the video recording/reproducing system 100 according to the embodiment of the invention. Referring now to FIG. 5, the structure of the video recording/reproducing system 100 will be explained hereinbelow according to the embodiment of the invention.

The video recording/reproducing system 100 shown in FIG. 5 is an illustration of signal processing system according to the embodiment of the invention, which is configured to encode video signals inputted to the video recording/reproducing system 100, subsequently record as a video stream, decode the recorded video stream, and reproduce subsequently. As shown in FIG. 5, the video recording/reproducing system 100 according to the embodiment of the invention is provided including a video encoder 110, a video decoder 120, and a recording medium 130.

The video encoder 110 is configured to encode baseband video signals inputted into the video recording/reproducing system 100. The video signals encoded by the video encoder 110 are recorded on a recording medium 130 as a video stream. The configuration of the video encoder 110 will be detailed later on.

The video decoder 120 is configured to decode the video stream recorded on the recording medium 130. The video stream decoded by the video decoder 120 is outputted from the video recording/reproducing system 100 as baseband video signals to be displayed subsequently on a video display unit (not shown) connected to the video recording/reproducing system 100. The configuration of the video decoder 120 will be detailed later on.

The recording medium 130 is configured to record the video signals encoded by the video encoder 110. The recording medium 130 includes, for example, a hard disc drive (HDD), CD-ROM, DVD-ROM, and other similar optical discs, and may alternatively include semiconductor memory devices such as a flash memory, solid state drive (SSD), and so forth.

Figure 6:
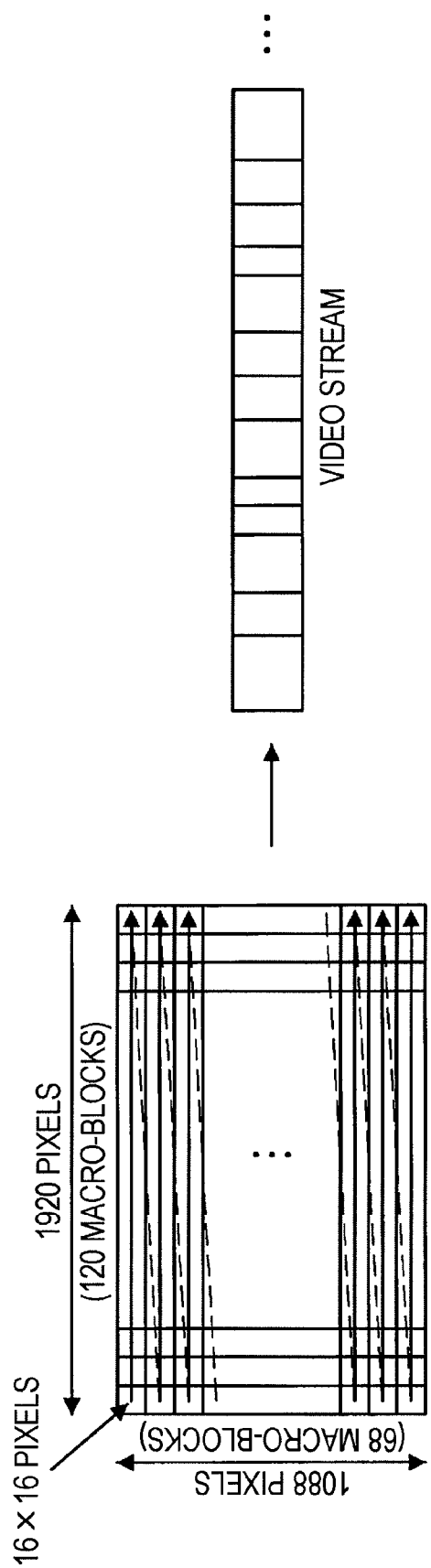
FIG. 6 is a drawing schematically illustrating the feature of the image signals during encoding with the video encoder, in which the image signals are inputted into the video recording/reproducing system according to the embodiment of the invention.

FIG. 6 is a drawing schematically illustrating the feature of the video signals during encoding with the video encoder 110, in which the video signals are inputted into the video recording/reproducing system 100 according to the embodiment of the invention. The video signals, which are inputted into the video recording/reproducing system 100 according to the embodiment of the invention, are encoded in terms of macroblock, as the minimum processing unit, which is formed including 16 times 16 pixels. As shown in FIG. 6, for example, in the case of encoding the video signals which include one image per frame having 1920 pixels in the horizontal direction and 1088 pixels in the vertical direction, one frame is divided into a plurality of macro-blocks, namely, to include 120 pieces thereof horizontally and 68 pieces vertically. Then, the video encoder 110 is operable to encode the video signals in units of thus divided macro block. The video encoder 110 also arrange the encoded data to be aligned from the left to right, and top to bottom of the screen, and subsequently recorded on the recording medium 130.

The configuration of video recording/reproducing system 100 has been described hereinabove according to the embodiment of the invention with reference to FIG. 5. In the next place, there described is the configuration of the video encoder 110 according to the embodiment of the invention.

2-2. The Configuration of Video Encoder According to the Embodiment of the Invention FIG. 7 is a diagram illustrating the configuration of the video encoder 110 according to the embodiment of the invention. Referring now to FIG. 7, the configuration of the video encoder 110 will be explained hereinbelow according to the embodiment of the invention.

As shown in FIG. 7, the video encoder 110 according to the embodiment of the invention is provided, including a baseband converter 111, a line memory 112, local encoders 113a to 113d, a stream converter 114, and a stream memory 115.

The baseband converter 111 is operable to divide the baseband video data per frame, which are inputted to the video recording/reproducing system 100, into predetermined blocks (which are each called as "sub-block" hereinafter) each corresponding to the line of micro-blocks (16 pixels). Subsequently, the baseband converter 111 is operable to temporarily store the video data, which are divided into the sub-blocks, in the line memory 112 in units of the sub-block. In addition, the baseband converter 111 is operable so that the baseband video data, which are stored in the line memory 112, are distributed and subsequently outputted in units of the sub-block, or line by line of the macro-block, among the local encoders 113a to 113d. The line memory 112 is thus configured to temporarily store the baseband image data, which are inputted to the video recording/reproducing system 100 under the control of the baseband converter 111 and divided into the sub-blocks by the baseband converter 111.

While one frame may be divided into sub-blocks of various forms, there described in the following explanation is the case of dividing into four with equal separation in the horizontal direction. As illustrated in FIG. 6, for example, the frame which has the number of pixels of 1920 in the horizontal direction, is divided into sub-blocks each having the horizontal pixel number of 480 (corresponding to 30 macro-blocks), to subsequently be stored in the line memory 112.

The local encoders 113a to 113d are operable to encode image data by predetermined coding systems such as MPEG and so forth. With the configuration shown in FIG. 7, the baseband converter 111 distributes the image data stored in the line memory 112 among the local encoders 113a to 113d in units of sub-block. Therefore, the local encoders 113a to 113d are configured to encode the image data divided into the sub-blocks and to output the image data following the encoding to the stream converter 114, respectively.

The number of local encoders is determined according to the pattern and the number, of division into the sub-blocks implemented earlier by the baseband converter 111. Since the division is made equally into four in the horizontal direction in the present embodiment, four local encoders are provided as well. Then, each of the local encoders receives, from the baseband converter 111, the image data divided into the sub-blocks each including 480 pixels (for 30 macro-blocks) horizontally and 16 pixels (for one macro-block) vertically. The local encoders 113a to 113d carry out encoding processing of the image data transmitted from the baseband converter 111.

The stream converter 114 operates to receive the image data, which were subjected to encoding processing by the local encoders 113a to 113d, and to store temporarily the thus received image data into the stream memory 115. In addition, the stream converter 114 operates to rearrange the image data, which were stored in the stream memory 115, into the order of the macro-blocks, and to output to the recording medium 130 as a video stream. The stream memory 115 is thus configured to store temporarily the image data which were subjected to encoding processing by the local encoders 113a to 113d under the control of the stream converter 114.

Figure 8A:
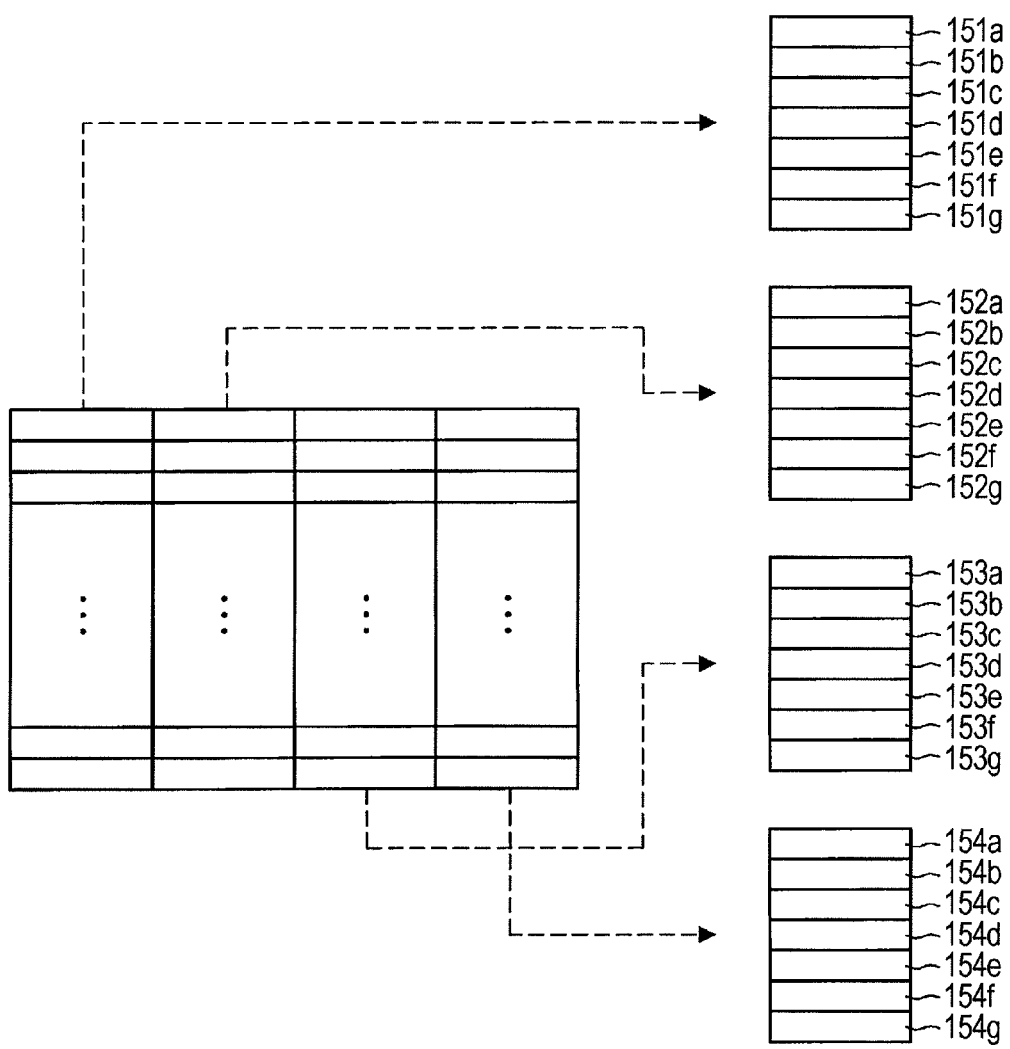
FIG. 8A is a diagram schematically illustrating the feature of encoding processing of the image data with the video encoder according to the embodiment of the invention.
Figure 8C:
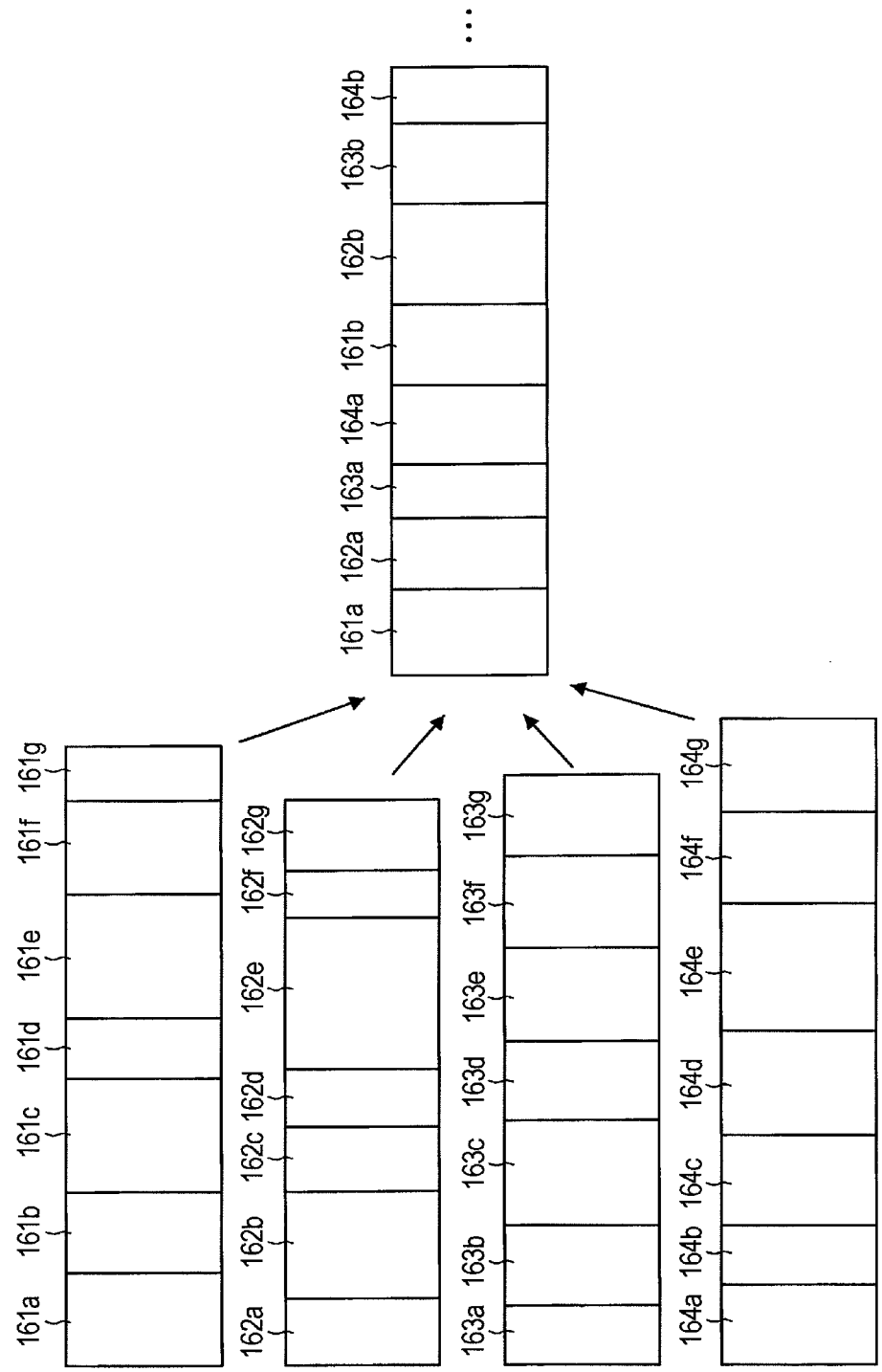
FIG. 8C is still another diagram schematically illustrating the feature of encoding processing of the image data with the video encoder according to the embodiment of the invention.

FIGS. 8A to 8C are diagrams schematically illustrating the feature of encoding processing of the image data with the video encoder 110 according to the embodiment of the invention.

First, as shown in FIG. 8A, the baseband converter 111 is configured to divide the image data into four in the horizontal direction and distribute thus divided image data among the local encoders 113a to 113d in units of sub-block one by one from the top of the screen. For example, the baseband converter 111 is operable to distribute sequentially to the local encoders 113a, 113b, 113c, and 113d from the leftmost sub-block. That is, to the local encoder 113a, the sub-blocks 151a, 151b . . . 151g . . . are distributed. Similarly, to the local encoder 113b, the sub-blocks 152a, 152b . . . 152g . . . are distributed; to the local encoder 113c, the sub-blocks 153a, 153b . . . 153g . . . are distributed; and to the local encoder 113d, the sub-blocks 154a, 154b . . . 154g . . . are distributed, respectively.

The local encoders 113a to 113d, to which the image data were distributed in units of sub-block, are each operable to encode thus distributed image data, and subsequently output to the stream converter 114, respectively. As shown in FIG. 8B, the sub-blocks 151a, 151b . . . 151g . . . which are distributed to the local encoder 113a, are subjected to the encoding by the local encoder 113a, to thereby result image data 161a, 161b, . . . 161g . . . subsequent to the encoding, respectively. In similar manner, the sub-blocks 152a, 152b . . . 152g . . . which are assigned to the local encoder 113b, are subjected to the encoding by the local encoder 113b, to thereby result image data 162a, 162b, . . . , 162g . . . subsequent to the encoding, respectively; the sub-blocks 153a, 153b . . . 153g . . . which are assigned to the local encoder 113c, are subjected to the encoding by the local encoder 113c, to thereby result image data 163a, 163b, . . . , 163g . . . subsequent to the encoding, respectively; and the sub-blocks 154a, 154b . . . 154g . . . which are assigned to the local encoder 113d, are subjected to the encoding by the local encoder 113d, to thereby result image data 164a, 164b, . . . , 164g . . . from the encoding, respectively.

With the stream converter 114, the image data subsequent to the encoding, which were sent from the local encoders 113a to 113d, are buffered once in the stream memory 115. In addition, as shown in FIG. 8C, the stream converter 114 is operable to restore image data which are buffered in the stream memory 115, by sorting to be aligned in the order of the macro-blocks, and to output as a video stream. By recording the video stream outputted from the stream converter 114 on the recording medium 130, video data to be inputted to the video recording/reproducing system 100 can be recorded on the recording medium 130.

The configuration of the video encoder 110 has been described hereinabove according to the embodiment of the invention. In the next place, there described hereinbelow is the configuration of the video decoder 120 according to the embodiment of the invention.

Figure 9:
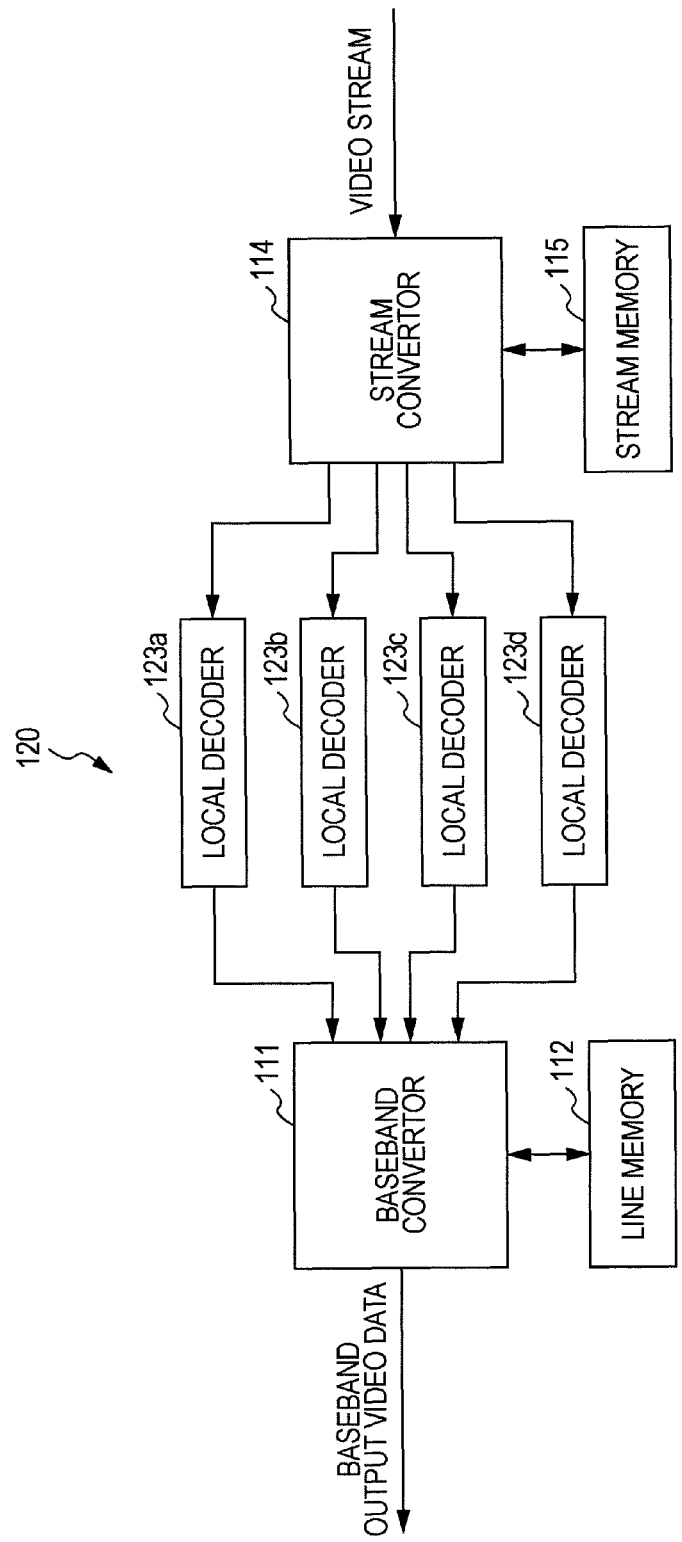
FIG. 9 is a diagram illustrating the configuration of the video decoder according to the embodiment of the invention.

2-3. The Configuration of Video Decoder According to the Embodiment of the Invention FIG. 9 is a diagram illustrating the configuration of the video decoder 120 according to the embodiment of the invention. Referring to FIG. 9, the configuration of the video decoder 120 will be explained hereinbelow according to the embodiment of the invention.

As shown in FIG. 9, the video decoder 120 according to the embodiment of the invention is provided, including a baseband converter 111, a line memory 112, local decoders 123a to 123d, a stream converter 114, and a stream memory 115.

The local decoders 123a to 123d are configured to decode the image data encoded by the local encoders 113a to 113d. With the configuration shown in FIG. 9, in reproducing the video data recorded on the recording medium 130, the video data recorded on the recording medium 130 are read by the stream converter 114, divided in units of sub-block, and stored temporarily in the stream memory 115. Subsequently, the stream converter 114 operates to distribute the image data stored in the stream memory 115 in units of sub-block among the local decoders 123a to 123d. The baseband converter 111 receives the image data, which were decoding processed by the local decoders 123a to 123d, and store thus received image data temporarily in the line memory 112. In addition, the baseband converter 111 is operable to sort the image data, which were stored in the line memory 112, to be aligned in the order of actual frame and to output as baseband video data.

Figure 10:
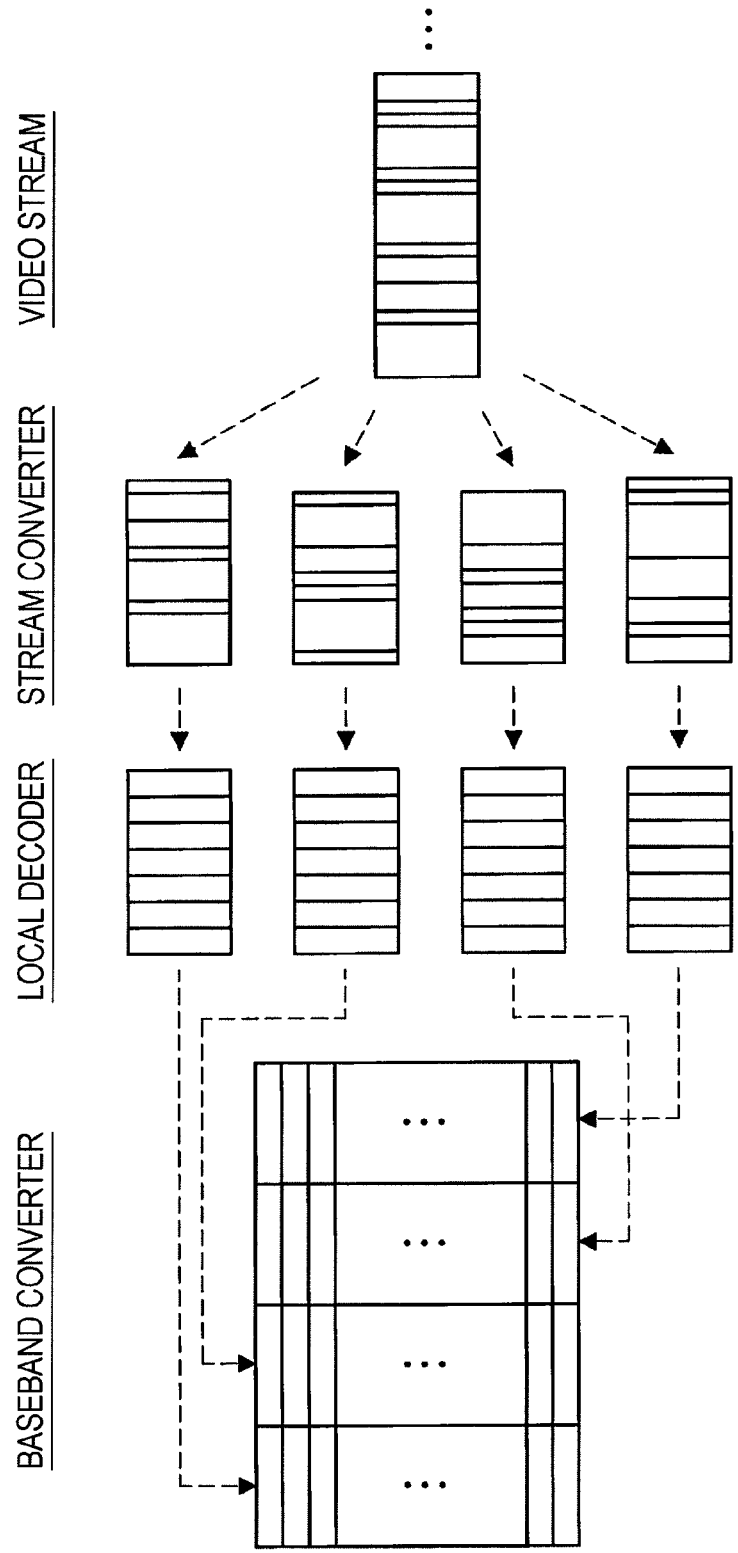
FIG. 10 is a diagram schematically illustrating the feature of decoding processing of the image data with the video decoder according to the embodiment of the invention.

FIG. 10 is a diagram schematically illustrating the feature of decoding processing of the image data with the video decoder 120 according to the embodiment of the invention.

In the case where the video data recorded on the recording medium 130 are decoded with the video decoder 120, the stream converter 114 acquires first the video stream from the recording medium 130. In order to decode the video stream, which are acquired by the stream converter 114, with the local decoders 123a to 123d, the video stream is divided into such blocks as to correspond to the aforementioned sub-blocks, and buffered in the stream memory 115.

When the video stream, which was divided into the blocks corresponding to the sub-blocks, was buffered in the stream memory 115, the stream converter 114 operates to read thus buffered data, and distribute among the local decoders 123a to 123d in sequence. For example, the stream converter 114 repeatedly distributes among the local decoders 123a, 123b, 123c, and 123d sequentially from the top sub-block. The local decoders 123a to 123d, to which the data were distributed in units of sub-block, each operate to decode distributed data, and to output thus decoded image data to the baseband converter 111.

With the baseband converter 111, the decoded image data, which are sent from the local decoders 123a to 123d, are buffered in the line memory 112. In addition, the baseband converter 111 operates to restore image data by sorting the image data, which are buffered in the line memory 112, to be aligned in the order of the macro-blocks, and to output as baseband video data.

Although the video encoder 110 and the video decoder 120 are illustrated in the present embodiment to share the baseband converter 111, line memory 112, stream converter 114, and stream memory 115, the present invention is not limited to those examples mentioned above.

The configuration of the video decoder 120 has been described hereinabove according to the embodiment of the invention. In the next place, there described hereinbelow are encoding processing steps of video data with the video recording/reproducing system 100 according to the embodiment of the invention.

Figure 11:
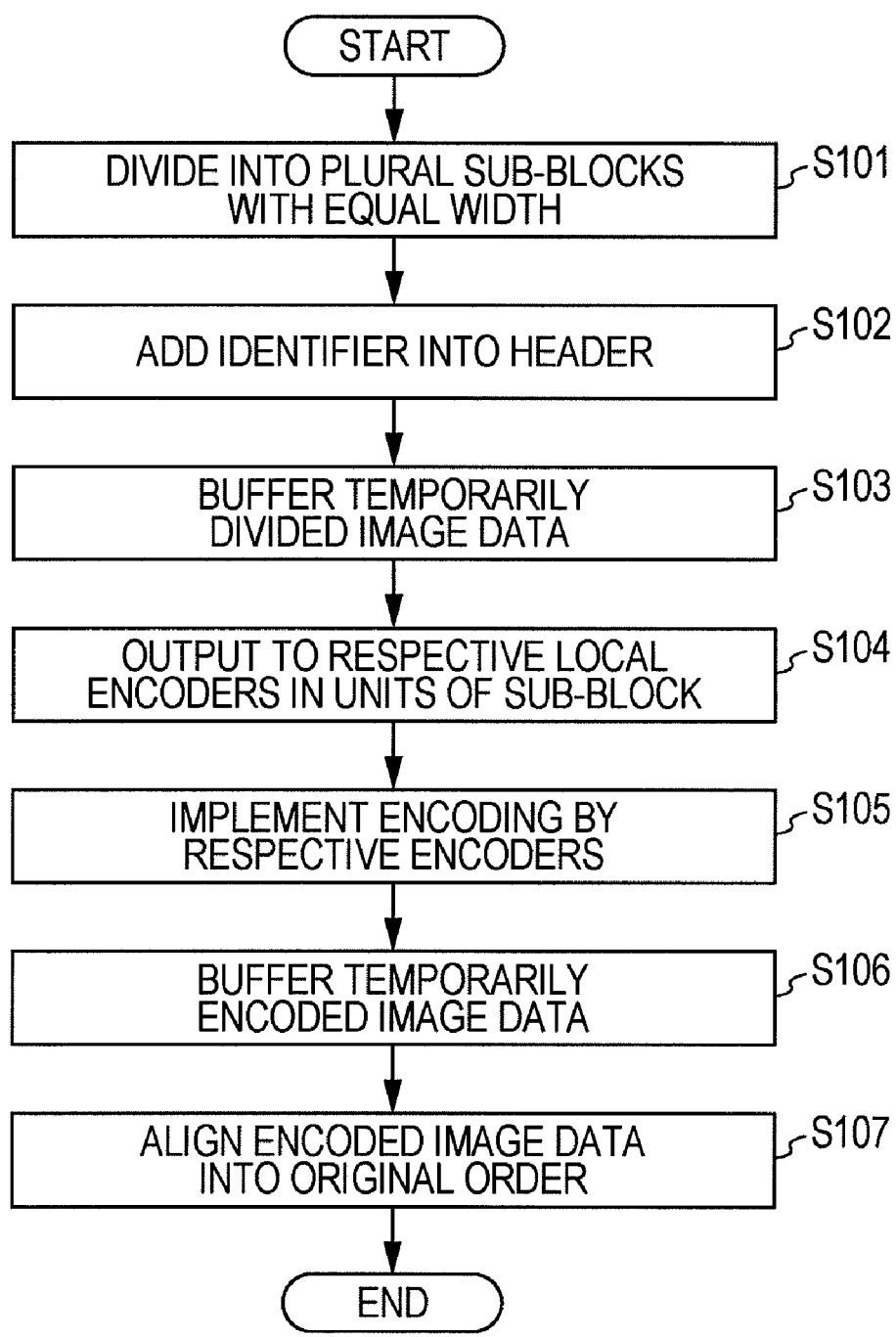
FIG. 11 is a flowchart illustrating encoding processing of the image data with the video recording/reproducing system according to the embodiment of the invention.

2-4. Encoding Processing Steps of Image Data According to the Embodiment of the Invention FIG. 11 is a flowchart illustrating encoding processing steps of the image data with the video recording/reproducing system 100 according to the embodiment of the invention. Referring now to FIG. 11, encoding processing steps of image data with the video recording/reproducing system 100 will be explained hereinbelow according to the embodiment of the invention.

When video signals are transmitted from the exterior to the video recording/reproducing system 100, encoding processing steps are carried out by the video encoder 110. In the case where encoding processing is carried out by the video encoder 110, the baseband converter 111 divides one frame into plural sub-blocks with equal width (step S101). After dividing into the sub-blocks by the baseband converter 111, an identifier for identifying the sequence of the image data is added in the header area of each sub-block so as to coincide with the sequence of the actual macro-blocks (step S102). The identifiers may be appended each in the header areas in the order such as, for example, 0, 1, 2, 3 . . . starting from the sub-block in the leftmost column.

In the above-mentioned step S101, when one frame is divided into plural sub-blocks with equal width by the baseband converter 111, the image data are buffered temporarily in the line memory 112 in units of thus divided sub-block (step S103). Subsequently, the baseband converter 111 operates to read out the image data, which are buffered in the line memory 112 in units of sub-block, and to distribute and then output to the local encoders 113a to 113d (step S104). For example, the baseband converter 111 may operate so as to distribute in sequence to the local encoders 113a, 113b, 113c, and 113d starting from the leftmost sub-block.

The local encoders 113a to 113d each encode the image data sent from the baseband converter 111 in sequence (step S105). The image data encoded by the local encoders 113a to 113d are sent to the stream converter 114. By the stream converter 114, the image data following the encoding are instructed to be buffered in the stream memory 115 (step S106).

On buffering the image data subsequent to the encoding in the stream memory 115, the stream converter 114 operates to align the buffered image data into original order so as to coincide with that of actual macro-blocks, and output to a recording medium 130 (step S107). This alignment processing by the stream converter 114 in this step S107 may be implemented, for example, by checking the identifier, which was added earlier to the header area of each sub-block in the above-mentioned step S102.

The encoding processing steps of image data with the video recording/reproducing system 100 according to the embodiment of the invention have been explained hereinabove. In the next place, there described hereinbelow are decoding processing steps with the video recording/reproducing system 100 according to the embodiment of the invention.

Figure 12:
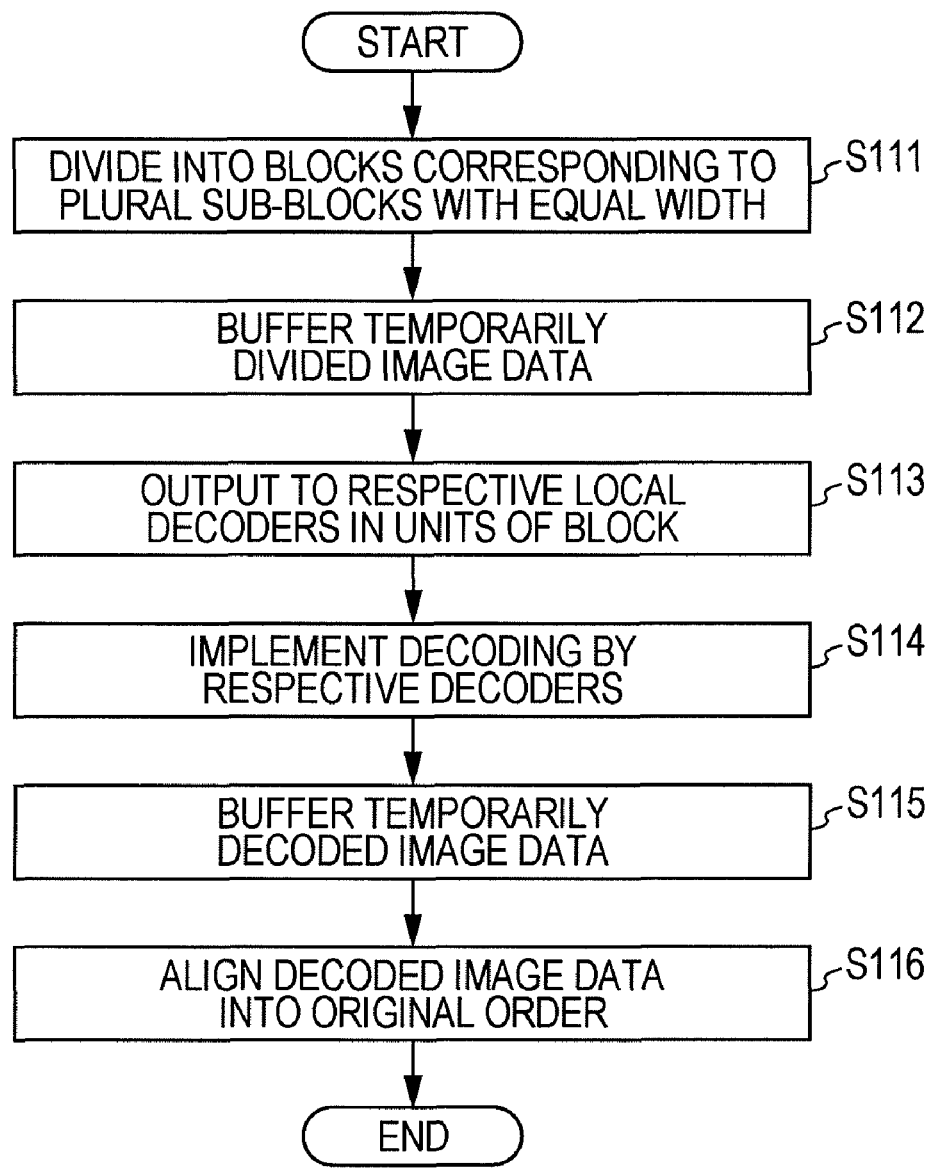
FIG. 12 is a flowchart illustrating decoding processing of the image data with the video recording/reproducing system according to the embodiment of the invention.

2-5. Decoding Processing Steps of Image Data According to the Embodiment of the Invention FIG. 12 is a flowchart illustrating encoding processing of the image data with the video recording/reproducing system 100 according to the embodiment of the invention. Referring to FIG. 12, encoding processes of image data with the video recording/reproducing system 100 will be explained hereinbelow according to the embodiment of the invention.

The video decoder 120 is operable to read and subsequently decode the video data recorded on the recording medium 130, and output the baseband video data. In the case where decoding processing is carried out by the video decoder 120, the video data recorded on the recording medium 130 are read by the stream converter 114, and divided into blocks, each having the height of one macro block and corresponding to plural sub-blocks with equal width (step S111). Incidentally, in the case where the stream converter 114 divides the plural sub-blocks, an identifier for identifying the sequence of the video data may be added in the header area of each sub-block so as to coincide with the sequence of the actual macro-blocks. With the stream converter 114, for example, the identifiers may be added each in the header areas in the order such as 0, 1, 2, 3 . . . starting from the sub-block in the leftmost sub-block.

In the above-mentioned step S111, when the video data recorded on the recording medium 130 are divided into blocks, which correspond to the sub-blocks with equal width, the stream converter 114 operates to temporarily buffer the image data in the stream memory 115 in the units of thus divided sub-block (step S112). Upon completion of the buffering of the image data temporarily in the stream memory 115 in units of sub-block, the stream converter 114 operates to read the image data, which were buffered in the stream memory 115, in units of sub-block. The image data, which are read by the stream converter 114, are distributed and outputted, to the local decoders 123a to 123d in units of sub-block, respectively (step S113).

The local decoders 123a to 123d each implement decoding processing to the image data in units of sub-block, which are outputted from the stream converter 114 (step S114). Upon completion of the decoding processing of the image data in units of sub-block, the local decoders 123a to 123d are operable to transmit the image data subsequent to decoding to the baseband converter 111. The baseband converter 111 temporarily buffers the image data decoded by the local decoders 123a to 123d in the line memory 112 in units of sub-block (step S115).

On temporarily buffering the image data subsequent to the decoding in the line memory 112, the baseband converter 111 operates to rearrange the buffered image data to be aligned into original order as to coincide with that of actual macro-blocks, and output as baseband video data (step S116). This alignment processing by the stream converter 111 in this step S116 may be implemented, for example, by checking the identifier added to the header area of each sub-block, or alternatively, if any identifier is added previously at the time of encoding of image data, by checking the identifier thus appended.

The decoding processing steps of video data with the video recording/reproducing system 100 according to the embodiment of the invention have been explained hereinabove. In the video recording/reproducing system 100 according to the embodiment of the invention, information about bit assignment may be exchanged among the plurality of the local encoders to thereby improve compression efficiency.

2-6. Summary

According to the embodiment of the invention as explained hereinabove, in the case of encoding the baseband video data inputted to the video recording/reproducing system 100 and subsequently recording on a recording medium, the process proceeds first to divide the baseband video signal inputted to the video recording/reproducing system 100 to plural sub-blocks each having equal width, and buffer divided image data temporarily in units of sub-block. Subsequently, the process proceeds to distribute thus buffered image data to plural local encoders in units of sub-block, and encode the image data, which are divided into sub-blocks, in sequence by each local encoder. Each of the local encoders transmits the image data subsequent to the encoding to the stream converter, and the stream converter operates to temporarily buffer the image data subsequent to the encoding, which are transmitted from each local encoder, in the stream memory. In addition, the stream converter operates to form the video stream by rearranging the image data subsequent to the encoding, which are temporarily buffered in the stream memory, to be aligned into the original order so as to coincide with that of actual macro-blocks, and to record the video stream on the recording medium.

In the case of reproducing the video stream recorded on the recording medium, the process proceeds first to read the image data, which are recorded on the recording medium as an video stream, by the stream converter, and to divide into the block corresponding to plural sub-blocks, each having equal width. The stream converter buffers thus divided image data temporarily. In addition, the process proceeds to distribute thus buffered image data to plural local decoders in units of block corresponding to the sub-block, and decode the image data, which are divided into the block corresponding the sub-block, in sequence by each of the local decoders. The image data, which were decoded by each of the local decoder, are sent to the baseband converter, and the baseband converter operates to buffer temporarily the image data subsequent to the decoding in the line memory. In addition, the baseband converter rearranges the image data subsequent to the encoding, which are buffered in the line memory, to be aligned into the original order so as to coincide with that of actual macro-blocks, and outputs as baseband video data.

As described above, by dividing the baseband image data into plural sub-blocks and implementing encoding processing and decoding processing, both the capacity and the bandwidth of the line memory and stream memory used for buffering the image data can be reduced as compared with those in the past. In addition, by temporarily storing the image data in units of frame the speed enhancement of the encoding processing and decoding processing by distributing to the plurality of encoders and decoders becomes feasible without using the frame memory with the features such as large capacity and broad bandwidth otherwise necessitated. Still in addition, by eliminating the use of the frame memory with large capacity and broad bandwidth, the processing becomes feasible within the application specific integrated circuit (ASIC) or field programmable gate array (FPGA), and this enables to contribute to low power consumption, low costs, easy mounting, and reduced system delay, as a result.

3. Modifications

3-1. A First Modification to the Embodiment of the Invention

Figure 13:
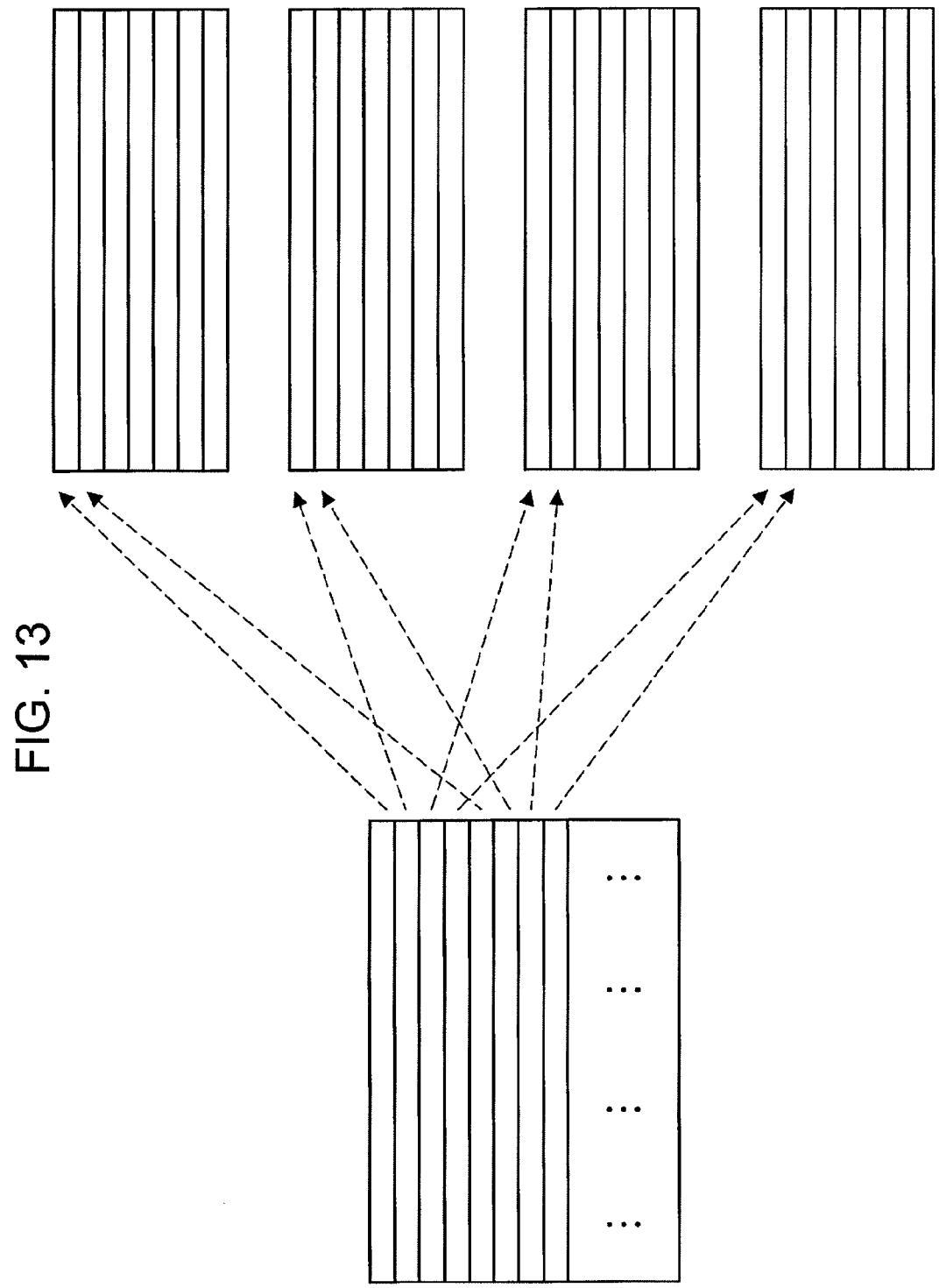
FIG. 13 is a drawing schematically illustrating division of the image data in the first modification to the embodiment of the invention.

In the next place, there will be described the first modification to the embodiment of the invention. In this first modification, the case is explained where image data of one screen are divided into plural blocks (or slices), in which each slice is formed so that the number of pixels in the vertical direction correspond to that of one macro-block, and distributed to plural encoders and decoders in units of slice. FIG. 13 is a drawing schematically illustrating the division of the image data in the first modification to the embodiment of the invention.

Referring to FIG. 13, in the first modification to the embodiment of the invention, the image data of one screen are divided into a plurality of slices. Subsequently, the thus divided image data are distributed to the plural local encoders in sequence from the top of the screen. For example, in the case where the video encoder 110 of FIG. 7 according to the embodiment of the invention is used, the baseband converter 111 is configured to distribute the slice of (4n+1)th from the top (n being a positive integer including zero) to the local encoder 113*a*, the (4n+2)th slice to the local encoder 113*b*, the (4n+3)th slice to the local encoder 113*c*, and the (4n+4)th slice to the local encoder 113*d*, respectively. Namely, there distributed to the local encoder 113*a* are the slices of the 1st, 5th, 9th, and so forth; and similarly to the local encoder 113*b* are the slices of the 2nd, 6th, 10th, and so forth; to the local encoder 113*c* are the slices of the 3rd, 7th, 11th, and so forth; and to the local encoder 113*d* are the slices of the 4th, 8th, 12th, and so forth, respectively.

Each of the local encoder is operable to encode the image data distributed from the baseband converter 111 in units of slice, and transmit to the stream converter 114. The stream converter 114 operates to buffer temporarily the image data subsequent to the encoding, which are transmitted from each of the local encoder, in the stream memory 115. In addition, the stream converter 114 is also operable to form the video stream by rearranging the image data subsequent to the encoding, which are buffered temporarily in the stream memory 115, into original order so as to coincide with that of actual macro-blocks, and to record the video stream on the recording medium 130.

In decoding the video stream recorded on the recording medium 130, the image data currently recorded on the recording medium 130 as the image stream are first read by the stream converter 114, and divided into the blocks corresponding to the slices. The stream converter 114 operates to buffer thus divided image data temporarily in the stream memory 115, and distributes the buffered image data in units of slice to plural local decoders 123*a* to 123*d*.

Each of the local decoders is operable to decode the image data, which are distributed from the stream converter 114 in units of slice, and transmit to the baseband converter 111. The baseband converter 111 receives the image data in units of slice, which are decoded by the local decoders 123*a* to 123*d*, and buffers temporarily in the line memory 112. In addition, the baseband converter 111 operates also to rearrange the image data subsequent to the decoding, which are buffered in the line memory 112, into original order so as to coincide with the order of actual macro-blocks, and to output as baseband video data.

As described herein above, by dividing the baseband image data in units of slice and implementing encoding processing and decoding processing, the bandwidth of the line memory and stream memory used for buffering the image data can be reduced as compared with those in the past. In addition, by distributing to the plurality of encoders and decoders, the speed enhancement of the encoding processing and decoding processing can be achieved without using the frame memory with the feature of broad bandwidth otherwise necessitated.

3-2. A Second Modification to the Embodiment of the Invention

The first modification to the embodiment of the invention has been described hereinabove. In the next place, there described hereinbelow is the second modification to the embodiment of the invention. In this second modification, the case is explained where image data of one screen are divided into a first plurality of regions and the thus divided regions are each divided further into a second plurality of blocks.

Figure 14:
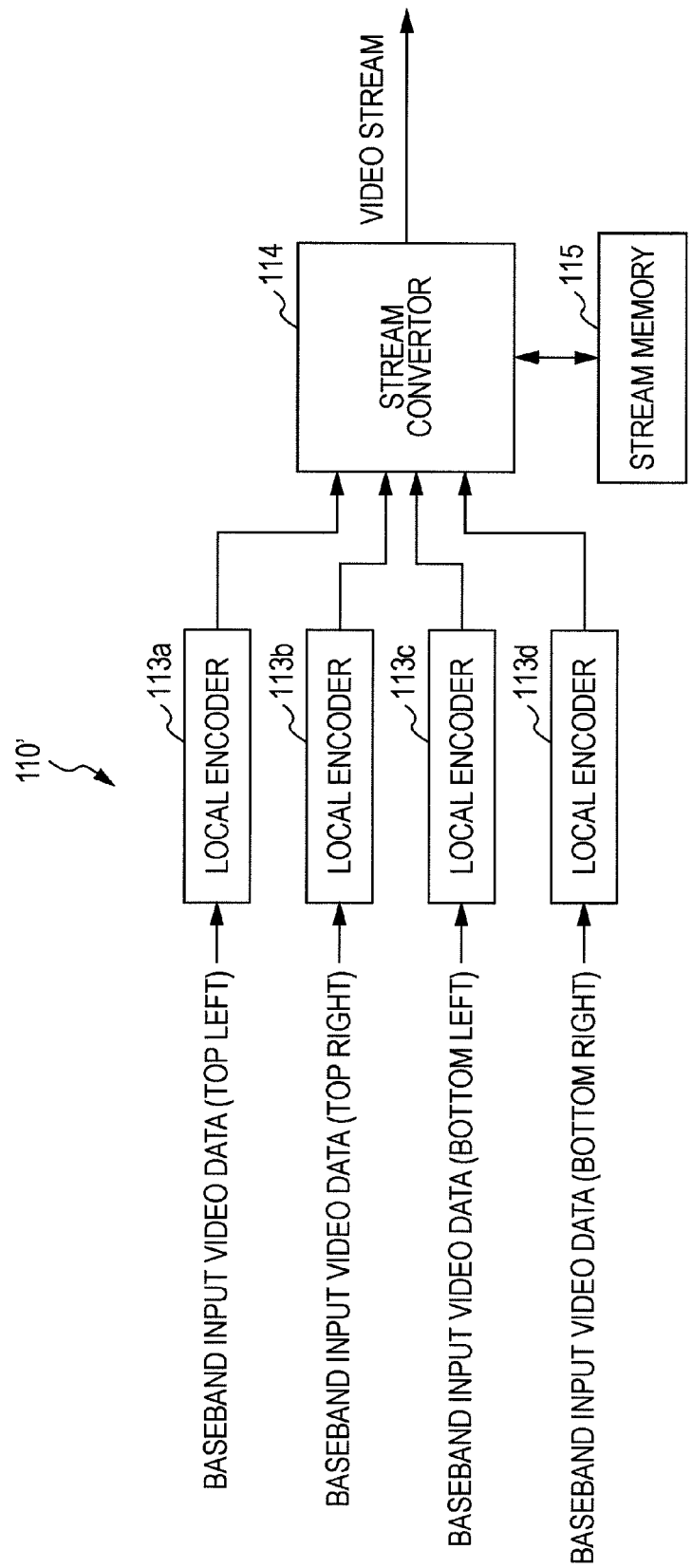
FIG. 14 is a diagram schematically illustrating the configuration of video encoder according the second modification to the embodiment of the invention.

FIG. 14 is a diagram schematically illustrating the configuration of video encoder 110' according the second modification to the embodiment of the invention. Referring now to FIG. 14, the configuration of the video encoder 110' will be explained hereinbelow according the second modification to the embodiment of the invention.

The video encoder 110' shown in FIG. 14 transmits the baseband input video data, which are divided beforehand into four regions, to the local encoders 113*a* to 113*d*, respectively. The local encoders 113*a* to 113*d*, to which the baseband input video data were transmitted, each encode the inputted video data in sequence, and transmit the image data subsequent to the encoding to the stream converter 114. The stream converter 114 operates to temporarily buffer the image data subsequent to the encoding in the stream memory 115. In addition, the stream converter 114 operates also to form video stream by rearranging the image data subsequent to the encoding, which are buffered in the stream memory 115, into original order so as to coincide with the order of actual macro-blocks, and to record on the recording medium 130.

Figure 15:
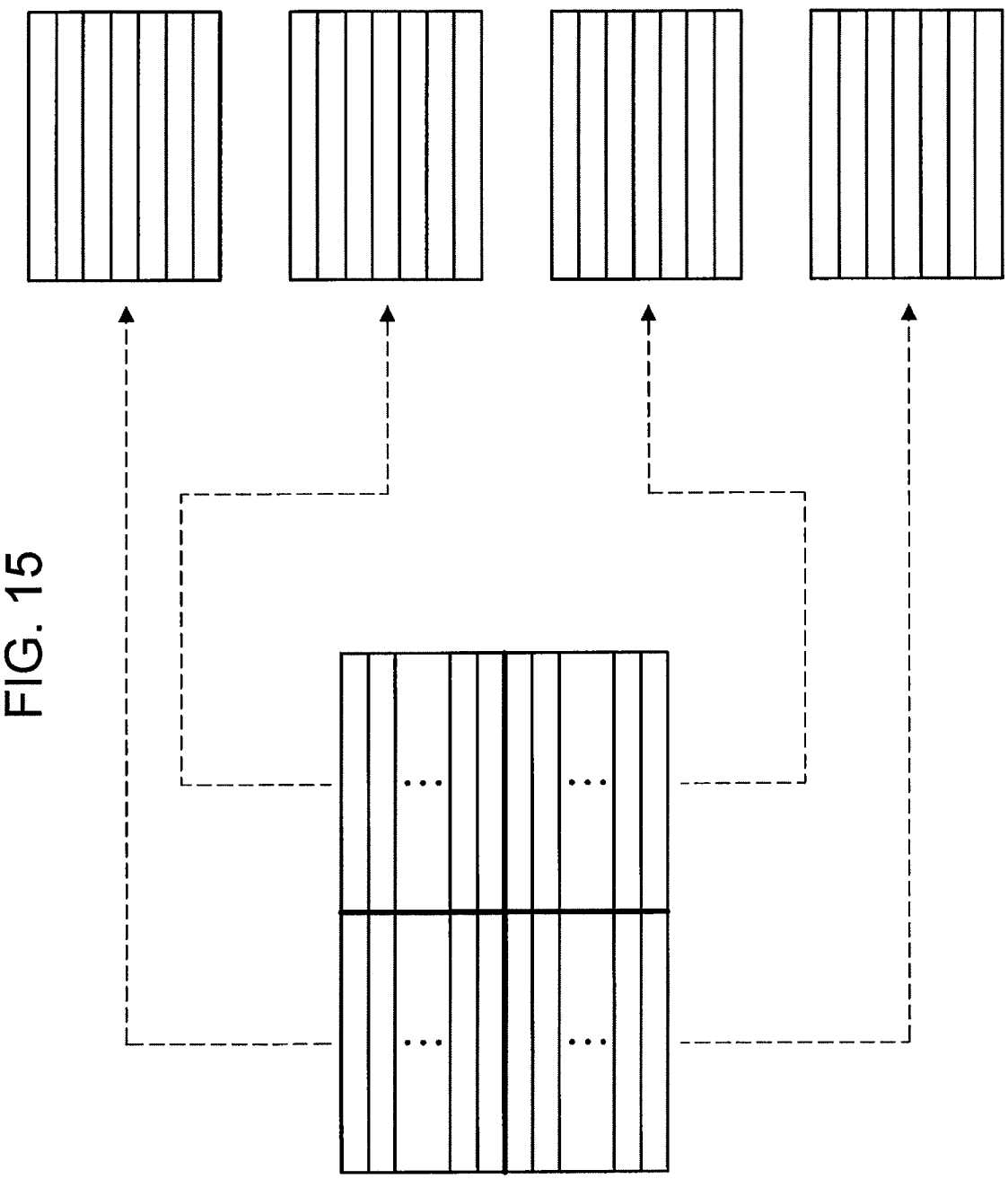
FIG. 15 is a drawing schematically illustrating the feature of baseband image signals during encoding with the video encoder according to the second modification to the embodiment of the invention.

FIG. 15 is a drawing schematically illustrating the feature of baseband video signals during encoding with the video encoder 110' according to the second modification to the embodiment of the invention. In this illustration of the modification, baseband video data to be inputted into the video encoder 110' are divided beforehand into four regions. In addition, the divided video data is further divided into the second plurality of blocks in the vertical direction to be transmitted subsequently to the local encoders 113*a* to 113*d*, and the local encoders 113*a* to 113*d* each implement the encoding in units of block.

In this embodiment, in the case where the video stream recorded on the recording medium 130 are decoded, the image data, which are currently recorded on the recording medium 130 as the video stream, are first read by the stream converter 114. Subsequently, the stream converter 114 divides thus read image data into blocks which correspond each to the blocks as encoding units. The stream converter 114 operates to buffer thus divided image data temporarily in the stream memory 115, and distributes the buffered image data to plural local decoders 123*a* to 123*d* in units of block.

Each of the local decoders is operable to decode and output the image data distributed from the stream converter 114. The image data subsequent to the decoding are transmitted to the baseband converter 111. The baseband converter 111 receives the image data in units of block, which were decoded by the local decoders 123*a* to 123*d*, and buffer temporarily in the line memory 112. In addition, the baseband converter 111 operates to rearrange the image data subsequent to the decoding, which are buffered in the line memory 112, into original order so as to coincide with the order of actual macro-blocks, and to output as baseband video data.

As described above, by dividing the baseband image data into the first plurality of regions and further dividing each of the regions into the second plurality of blocks in the vertical direction, and implementing encoding processing and decoding processing, the bandwidth of the line memory and stream memory used for buffering the image data can be reduced as compared with those in the past. In addition, by distributing to the plurality of encoders and decoders, the speed enhancement of the encoding processing and decoding processing can be achieved without using the frame memory with the feature of broad bandwidth otherwise necessitated.

Incidentally, the abovementioned encoding processing and decoding processing of the video data by the video recording/reproducing system 100 according to the embodiment of the invention, may be implemented alternatively by using hardware, namely, by storing computer programs inside the video recording/reproducing system 100, reading by operational equipment such as central processing unit (CPU) and so forth, and executing in sequence. These computer programs may be stored in non-volatile storage devices such as flash memory and so forth, or alternatively on the recording media such as CD-ROM, DVD-ROM, and so forth.

While preferred embodiments of the present invention have been described hereinabove with reference to the drawings, the foregoing description is intended to be illustrative, not limiting.

The present application contains subject matter related to that disclosed in Japanese Priority Patent Application JP 2009-024376 filed in the Japan Patent Office on Feb. 5, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing system, comprising:
a signal dividing unit configured to divide input image signals per frame into a first plurality of sub-blocks, each sub-block having a height in a vertical direction equal to that of at least one macro-block, and a second plurality of said sub-blocks being arranged in a horizontal direction;
a first recording unit configured to record the divided input image signals in units of the sub-block to form divided and recorded input image signals;
a third plurality of encoding units each configured to encode the divided and recorded input image signals in units of the sub-block to be outputted as an encoded stream, a number of the third plurality of encoding units being equal to a number of the sub-blocks divided by the signal dividing unit in the horizontal direction;
a second recording unit configured to record the encoded stream in units of the sub-block to form an encoded and recorded stream; and
a stream conversion unit configured to output a video stream after rearranging the encoded and recorded stream such that an order of the output video stream coincides with the order of the input image signals.

2. The signal processing system according to claim 1, wherein
the signal dividing unit is configured to add an identifier for identifying a region in the horizontal direction on dividing the input image signals into the sub-blocks.

3. A signal processing system, comprising:
a signal dividing unit configured to divide a video stream per frame so as to correspond to a first plurality of sub-blocks, each sub-block having a height in a vertical direction equal to that of at least one macro-block, and second plurality of said sub-blocks being arranged in a horizontal direction;
a first recording unit configured to record the divided video stream in units of the sub-block to form a divided and recorded video stream;
a third plurality of decoding units each configured to decode the divided and recorded video stream in units of the sub-block to be outputted as decoded data, a number of the third plurality of decoding units being equal to a number of the sub-blocks divided by the signal dividing unit in a horizontal direction;
a second recording unit configured to record the decoded data in units of the sub-block to form decoded and recorded data; and
an image signal conversion unit configured to output image signals after rearranging the decoded and recorded data such that an order of the output image signals coincides with the order of the video stream.

4. The signal processing system according to claim 3, wherein
the signal dividing unit is configured to add an identifier for identifying a region in a horizontal direction on dividing the video stream into the sub-blocks.

5. A signal processing method, comprising the steps of:
dividing, by a central processing unit, input image signals per frame into a first plurality of sub-blocks, each sub-block having a height in a vertical direction equal to that of at least one macro-block, and a second plurality of said sub-blocks being arranged in a horizontal direction;
recording the divided input image signals in units of the sub-block to form divided and recorded input image signals;
encoding, by the central processing unit, the divided and recorded input image signals by a third plurality of encoding means in units of the sub-block to be outputted as an encoded stream, a number of the third plurality of encoding means being equal to a number of the sub-blocks in a horizontal direction;
recording the encoded stream in units of the sub-block to form an encoded and recorded stream; and
outputting a video stream subsequent to stream conversion after rearranging the encoded and recorded stream such that the order of the output vide stream coincides with the order of the input image signals.

6. A signal processing method, comprising the steps of:
dividing, by a central processing unit, a video stream per frame so as to correspond to a first plurality of sub-blocks, each sub-block having a height in a vertical direction equal to that of at least one macro-block, and a second plurality of said sub-blocks being arranged in a horizontal direction;
recording the divided video stream in units of the sub-block to form a divided and recorded video stream;

decoding, by the central processing unit, the divided and recorded video stream by a third plurality of decoding means in units of the sub-block to be outputted as decoded data, a number of the third plurality of decoding means being equal to a number of the sub-blocks in the horizontal direction;

recording the decoded data in units of the sub-block to form decoded and recorded data; and outputting image signals subsequent to image signal conversion after rearranging the decoded and recorded data such that the order of the output image signals coincides with the order of the video stream.

* * * * *